US 11,705,555 B2

(12) United States Patent
Mikhaylik et al.

(10) Patent No.: US 11,705,555 B2
(45) Date of Patent: Jul. 18, 2023

(54) ELECTROLYTE MATERIALS FOR USE IN ELECTROCHEMICAL CELLS

(71) Applicant: Sion Power Corporation, Tucson, AZ (US)

(72) Inventors: Yuriy V. Mikhaylik, Tucson, AZ (US); Igor P. Kovalev, Vail, AZ (US)

(73) Assignee: Sion Power Corporation, Tucson, AZ (US)

( * ) Notice: Subject to any disclaimer, the term of this patent is extended or adjusted under 35 U.S.C. 154(b) by 0 days.

(21) Appl. No.: 15/647,383

(22) Filed: Jul. 12, 2017

(65) Prior Publication Data

US 2018/0006303 A1    Jan. 4, 2018

Related U.S. Application Data

(63) Continuation of application No. 13/216,538, filed on Aug. 24, 2011, now Pat. No. 9,853,287.
(Continued)

(51) Int. Cl.
| | | |
|---|---|---|
| *H01M 4/58* | (2010.01) | |
| *H01M 4/36* | (2006.01) | |
| *H01M 4/38* | (2006.01) | |
| *H01M 4/40* | (2006.01) | |
| *H01M 4/62* | (2006.01) | |
| *H01M 10/0525* | (2010.01) | |

(Continued)

(52) U.S. Cl.
CPC ........... *H01M 4/581* (2013.01); *H01M 4/366* (2013.01); *H01M 4/382* (2013.01); *H01M 4/405* (2013.01); *H01M 4/62* (2013.01); *H01M 10/0525* (2013.01); *H01M 10/0565* (2013.01); *H01M 50/403* (2021.01); *H01M 50/46* (2021.01); *H01M 4/134* (2013.01); *H01M 4/5815* (2013.01); *H01M 10/0568* (2013.01); *H01M 10/0569* (2013.01); *H01M 2300/0037* (2013.01)

(58) Field of Classification Search
CPC ......................................... H01M 10/056–0569
See application file for complete search history.

(56) References Cited

U.S. PATENT DOCUMENTS

| | | |
|---|---|---|
| 3,915,743 A | 10/1975 | Lauck |
| 4,069,375 A | 1/1978 | Lauck |

(Continued)

FOREIGN PATENT DOCUMENTS

| | | |
|---|---|---|
| CN | 1925207 A | 3/2007 |
| CN | 1983706 A | 6/2007 |

(Continued)

OTHER PUBLICATIONS

Mikhaylik et al., Low Temperature Performance of Li/S Batteries. J. Electrochem. Soc. 2003;150(3):A306-11.
(Continued)

*Primary Examiner* — Stephan J Essex
(74) *Attorney, Agent, or Firm* — Wolf, Greenfield & Sacks, P.C.

(57) ABSTRACT

Electrolyte materials for use in electrochemical cells, electrochemical cells comprising the same, and methods of making such materials and cells, are generally described. In some embodiments, the materials, processes, and uses described herein relate to electrochemical cells comprising sulfur and lithium such as, for example, lithium sulfur batteries.

16 Claims, 1 Drawing Sheet

Related U.S. Application Data

(60) Provisional application No. 61/376,559, filed on Aug. 24, 2010.

(51) Int. Cl.
  *H01M 10/0565* (2010.01)
  *H01M 50/46* (2021.01)
  *H01M 50/403* (2021.01)
  *H01M 4/134* (2010.01)
  *H01M 10/0568* (2010.01)
  *H01M 10/0569* (2010.01)

(56) References Cited

U.S. PATENT DOCUMENTS

| | | |
|---|---|---|
| 4,104,451 A | 8/1978 | Klemann et al. |
| 4,162,202 A | 7/1979 | Dey |
| 4,238,721 A | 12/1980 | Berman et al. |
| 4,264,689 A | 4/1981 | Moses |
| 4,324,846 A | 4/1982 | Kaun et al. |
| 4,410,609 A | 10/1983 | Peled et al. |
| 4,816,358 A | 3/1989 | Holleck et al. |
| 4,857,423 A | 8/1989 | Abraham et al. |
| 4,925,749 A | 5/1990 | Wright |
| 4,981,672 A | 1/1991 | De Neufville et al. |
| 5,021,308 A | 6/1991 | Armand et al. |
| 5,037,712 A | 8/1991 | Schackle et al. |
| 5,112,704 A | 5/1992 | Furukawa et al. |
| 5,277,514 A | 1/1994 | Glickman |
| 5,314,765 A | 5/1994 | Bates |
| 5,352,967 A | 10/1994 | Nutz et al. |
| 5,387,479 A | 2/1995 | Koksbang |
| 5,415,954 A | 5/1995 | Gauthier et al. |
| 5,429,891 A | 7/1995 | Gozdz et al. |
| 5,435,054 A | 7/1995 | Tonder et al. |
| 5,436,091 A | 7/1995 | Shackle et al. |
| 5,462,566 A | 10/1995 | Skotheim |
| 5,514,493 A | 5/1996 | Waddell et al. |
| 5,522,955 A | 6/1996 | Brodd |
| 5,529,860 A | 6/1996 | Skotheim et al. |
| 5,538,812 A | 7/1996 | Lee et al. |
| 5,569,520 A | 10/1996 | Bates |
| 5,580,684 A | 12/1996 | Yokoyama et al. |
| 5,601,947 A | 2/1997 | Skotheim et al. |
| 5,648,187 A | 7/1997 | Skotheim |
| 5,681,615 A | 10/1997 | Affinito et al. |
| 5,686,201 A | 11/1997 | Chu |
| 5,690,702 A | 11/1997 | Skotheim et al. |
| 5,723,230 A | 3/1998 | Naoi et al. |
| 5,731,104 A | 3/1998 | Ventura et al. |
| 5,783,330 A | 7/1998 | Naoi et al. |
| 5,792,575 A | 8/1998 | Naoi et al. |
| 5,800,939 A | 9/1998 | Mishina et al. |
| 5,824,434 A | 10/1998 | Kawakami et al. |
| 5,882,812 A | 3/1999 | Visco et al. |
| 5,882,819 A | 3/1999 | Naoi et al. |
| 5,888,672 A | 3/1999 | Gustafson et al. |
| 5,900,718 A | 5/1999 | Tsenter |
| 5,919,587 A | 7/1999 | Mukherjee et al. |
| 5,935,724 A | 8/1999 | Spillman et al. |
| 5,935,728 A | 8/1999 | Spillman et al. |
| 5,961,672 A | 10/1999 | Skotheim et al. |
| 6,017,651 A | 1/2000 | Nimon et al. |
| 6,025,094 A | 2/2000 | Visco et al. |
| 6,027,827 A | 2/2000 | Gan et al. |
| 6,030,720 A | 2/2000 | Chu et al. |
| 6,030,726 A | 2/2000 | Takeuchi et al. |
| 6,060,184 A | 5/2000 | Gan et al. |
| 6,117,590 A | 9/2000 | Skotheim et al. |
| 6,117,593 A | 9/2000 | Stachoviak et al. |
| 6,136,377 A | 10/2000 | Sovell |
| 6,136,464 A | 10/2000 | Wakabe et al. |
| 6,136,477 A | 10/2000 | Gan et al. |
| 6,153,337 A | 11/2000 | Carlson et al. |
| 6,165,645 A * | 12/2000 | Nishimura ............ H01M 6/181 429/218.1 |
| 6,168,884 B1 | 1/2001 | Neudecker et al. |
| 6,183,901 B1 | 2/2001 | Ying et al. |
| 6,190,426 B1 | 2/2001 | Thibault et al. |
| 6,194,099 B1 | 2/2001 | Gernov et al. |
| 6,201,100 B1 | 3/2001 | Gorkovenko et al. |
| 6,210,831 B1 | 4/2001 | Gorkovenko et al. |
| 6,210,836 B1 | 4/2001 | Takada et al. |
| 6,210,839 B1 | 4/2001 | Gan et al. |
| 6,218,054 B1 | 4/2001 | Webber |
| 6,225,002 B1 | 5/2001 | Nimon et al. |
| 6,238,821 B1 | 5/2001 | Muherjee et al. |
| 6,296,967 B1 | 10/2001 | Jacobs et al. |
| 6,306,545 B1 | 10/2001 | Carlson et al. |
| 6,329,789 B1 | 12/2001 | Gavrilov et al. |
| 6,402,795 B1 | 6/2002 | Chu et al. |
| 6,406,815 B1 | 6/2002 | Sandberg et al. |
| 6,413,285 B1 | 7/2002 | Chu et al. |
| 6,432,584 B1 | 8/2002 | Visco et al. |
| 6,436,583 B1 | 8/2002 | Mikhaylik |
| 6,632,573 B1 | 10/2003 | Nimon et al. |
| 6,664,006 B1 | 12/2003 | Munshi et al. |
| 6,683,440 B2 | 1/2004 | Kawakami et al. |
| 6,716,372 B2 | 4/2004 | Barker et al. |
| 6,733,924 B1 | 5/2004 | Skotheim et al. |
| 6,797,428 B1 | 9/2004 | Skotheim et al. |
| 6,835,495 B2 | 12/2004 | Michot et al. |
| 6,882,130 B2 | 4/2005 | Handa et al. |
| 6,902,848 B1 | 6/2005 | Izuchi et al. |
| 6,936,381 B2 | 8/2005 | Skotheim et al. |
| 7,247,408 B2 | 7/2007 | Skotheim et al. |
| 7,250,233 B2 | 7/2007 | Choi et al. |
| 7,276,218 B2 | 10/2007 | Barker et al. |
| 7,282,295 B2 | 10/2007 | Visco et al. |
| 7,316,868 B2 | 1/2008 | Gorkovenko |
| 7,354,680 B2 | 4/2008 | Mikhaylik |
| 7,358,012 B2 | 4/2008 | Mikhaylik |
| 7,553,590 B2 | 6/2009 | Mikhaylik |
| 7,645,543 B2 | 1/2010 | Visco et al. |
| 7,646,171 B2 | 1/2010 | Mikhayik |
| 7,688,075 B2 | 3/2010 | Kelley et al. |
| 7,771,870 B2 | 8/2010 | Affinito et al. |
| 7,785,730 B2 | 8/2010 | Affinito et al. |
| 7,842,421 B2 | 11/2010 | Mikhaylik |
| 7,939,198 B2 | 5/2011 | Mukherjee et al. |
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,197,971 B2 | 6/2012 | Skotheim et al. |
| 8,264,205 B2 | 9/2012 | Kopera |
| 8,338,034 B2 | 12/2012 | Affinito et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,735,002 B2 | 5/2014 | Scordilis-Kelley et al. |
| 8,748,043 B2 | 6/2014 | Mikhaylik |
| 8,753,771 B2 | 6/2014 | Skotheim et al. |
| 8,828,610 B2 | 9/2014 | Mikhaylik |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont et al. |
| 9,005,809 B2 | 4/2015 | Wilkening et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,214,678 B2 | 12/2015 | Mikhaylik |
| 9,397,342 B2 | 7/2016 | Skotheim et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |

(56) References Cited

U.S. PATENT DOCUMENTS

| | | | |
|---|---|---|---|
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,577,289 B2 | 2/2017 | Liao et al. |
| 9,653,735 B2 | 5/2017 | Skotheim et al. |
| 9,653,750 B2 | 5/2017 | Laramie et al. |
| 9,711,784 B2 | 7/2017 | Kelley et al. |
| 9,716,291 B2 | 7/2017 | Mikhaylik |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,847,550 B2 | 12/2017 | Scordilis-Kelley et al. |
| 9,859,588 B2 | 1/2018 | Mikhaylik |
| 10,050,308 B2 | 8/2018 | Liao et al. |
| 2002/0012846 A1* | 1/2002 | Skotheim | H01M 50/46 429/231.95 |
| 2002/0015885 A1* | 2/2002 | Hara | H01M 10/4235 429/212 |
| 2002/0034688 A1 | 3/2002 | Chu et al. |
| 2002/0045102 A1 | 4/2002 | Jung et al. |
| 2002/0106560 A1 | 8/2002 | Kolb et al. |
| 2002/0122987 A1 | 9/2002 | Tamura et al. |
| 2002/0192557 A1 | 12/2002 | Choi et al. |
| 2003/0006735 A1 | 1/2003 | Kawakami et al. |
| 2003/0082442 A1 | 5/2003 | Choi et al. |
| 2004/0048154 A1 | 3/2004 | Jung et al. |
| 2004/0091776 A1 | 5/2004 | Hwang |
| 2004/0126653 A1 | 7/2004 | Visco et al. |
| 2004/0191617 A1* | 9/2004 | Visco | H01M 4/13 429/137 |
| 2005/0064293 A1 | 3/2005 | Shen et al. |
| 2005/0089793 A1 | 4/2005 | Kang et al. |
| 2005/0095504 A1 | 5/2005 | Kim et al. |
| 2005/0147886 A1 | 7/2005 | Mikhaylik |
| 2005/0156575 A1 | 7/2005 | Mikhaylik |
| 2005/0196672 A1 | 9/2005 | Mukherjee et al. |
| 2006/0068296 A1 | 3/2006 | Nakagawa et al. |
| 2006/0115579 A1 | 6/2006 | Mukherjee et al. |
| 2006/0208701 A1 | 9/2006 | Mikhaylik |
| 2006/0228626 A1* | 10/2006 | Kawashima | H01M 4/38 429/200 |
| 2006/0292451 A1 | 12/2006 | Lee et al. |
| 2007/0009805 A1 | 1/2007 | Wright et al. |
| 2007/0082264 A1 | 4/2007 | Mikhaylik |
| 2007/0082270 A1* | 4/2007 | Mikhaylik | H01M 4/13 429/326 |
| 2007/0202401 A1 | 8/2007 | Viavattine |
| 2007/0221265 A1 | 9/2007 | Affinito et al. |
| 2008/0131772 A1 | 6/2008 | Jambunathan et al. |
| 2008/0138702 A1* | 6/2008 | Nakamura | H01M 10/0525 429/163 |
| 2008/0193835 A1 | 8/2008 | Mikhaylik |
| 2008/0318128 A1 | 12/2008 | Simoneau et al. |
| 2009/0035646 A1 | 2/2009 | Mikhaylik et al. |
| 2009/0053592 A1 | 2/2009 | Mino et al. |
| 2009/0055110 A1 | 2/2009 | Kelley et al. |
| 2009/0186263 A1 | 7/2009 | Pozin et al. |
| 2009/0280410 A1 | 11/2009 | Zaguib et al. |
| 2010/0119955 A1 | 5/2010 | Abe et al. |
| 2010/0129699 A1 | 5/2010 | Mikhaylik et al. |
| 2010/0239914 A1 | 9/2010 | Mikhaylik et al. |
| 2011/0006738 A1 | 1/2011 | Mikhaylik et al. |
| 2011/0008680 A1 | 1/2011 | Muldoon et al. |
| 2011/0014524 A1 | 1/2011 | Skotheim et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0076572 A1 | 3/2011 | Amine et al. |
| 2011/0159376 A1 | 6/2011 | Skotheim et al. |
| 2011/0165471 A9 | 7/2011 | Skotheim et al. |
| 2011/0177398 A1 | 7/2011 | Affinito et al. |
| 2011/0183203 A1 | 7/2011 | Du et al. |
| 2011/0193015 A1 | 8/2011 | Yamamoto et al. |
| 2011/0206992 A1 | 8/2011 | Campbell et al. |
| 2011/0256450 A1 | 10/2011 | Campbell et al. |
| 2011/0287305 A1 | 11/2011 | Scordilis-Kelley et al. |
| 2012/0048729 A1 | 3/2012 | Mikhaylik et al. |
| 2012/0052339 A1 | 3/2012 | Mikhaylik et al. |
| 2012/0052397 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2012/0171576 A1 | 7/2012 | Tsai et al. |
| 2013/0017441 A1 | 1/2013 | Affinito et al. |
| 2013/0059193 A1 | 3/2013 | Kishimoto et al. |
| 2013/0164635 A1 | 6/2013 | Schmidt et al. |
| 2013/0316072 A1 | 11/2013 | Scordilis-Kelley et al. |
| 2014/0062411 A1 | 3/2014 | Mikhaylik et al. |
| 2014/0079994 A1 | 3/2014 | Affinito et al. |
| 2014/0127419 A1 | 5/2014 | Fleischmann et al. |
| 2014/0127577 A1 | 5/2014 | Fleischmann et al. |
| 2014/0272537 A1 | 9/2014 | Kretschmar et al. |
| 2014/0272559 A1 | 9/2014 | Kretschmar et al. |
| 2014/0272565 A1 | 9/2014 | Gronwald et al. |
| 2014/0272594 A1 | 9/2014 | Safont et al. |
| 2014/0272595 A1 | 9/2014 | Cristadoro et al. |
| 2014/0272597 A1 | 9/2014 | Mikhaylik et al. |
| 2015/0010804 A1 | 1/2015 | Laramie et al. |
| 2015/0044517 A1 | 2/2015 | Mikhaylik et al. |
| 2015/0086837 A1 | 3/2015 | Laramie et al. |
| 2015/0162586 A1 | 6/2015 | Fleischmann et al. |
| 2015/0180037 A1 | 6/2015 | Gronwald et al. |
| 2015/0180084 A1 | 6/2015 | Scordilis-Kelley et al. |
| 2015/0188194 A1 | 7/2015 | Mikhaylik et al. |
| 2015/0236320 A1 | 8/2015 | Laramie et al. |
| 2015/0236322 A1 | 8/2015 | Laramie et al. |
| 2015/0280277 A1 | 10/2015 | Fleischmann et al. |
| 2015/0287986 A1 | 10/2015 | Affinito et al. |
| 2015/0287998 A1 | 10/2015 | Scordilis-Kelley et al. |
| 2015/0318539 A1 | 11/2015 | Kelley et al. |
| 2015/0349310 A1 | 12/2015 | Viner et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0301080 A1 | 10/2016 | Skotheim et al. |
| 2016/0344067 A1 | 11/2016 | Laramie et al. |
| 2017/0018815 A1 | 1/2017 | Laramie et al. |
| 2017/0047590 A1 | 2/2017 | Mikhaylik et al. |
| 2017/0149089 A1 | 3/2017 | Scordilis-Kelley et al. |
| 2017/0141385 A1 | 5/2017 | Scordilis-Kelley et al. |
| 2017/0141402 A1 | 5/2017 | Affinito et al. |
| 2017/0141442 A1 | 5/2017 | Mikhaylik et al. |
| 2017/0149086 A1 | 5/2017 | Du et al. |
| 2017/0182722 A1 | 6/2017 | Matsumura et al. |
| 2017/0200975 A1 | 7/2017 | Liao et al. |
| 2017/0250390 A1 | 8/2017 | Laramie et al. |
| 2017/0288208 A1 | 10/2017 | Kelley et al. |
| 2018/0006303 A1 | 1/2018 | Mikhaylik et al. |
| 2018/0108946 A1 | 4/2018 | Scordilis-Kelley et al. |
| 2018/0198164 A1 | 7/2018 | Mikhaylik |
| 2018/0375155 A1 | 12/2018 | Liao et al. |

FOREIGN PATENT DOCUMENTS

| | | |
|---|---|---|
| CN | 101145622 A | 3/2008 |
| CN | 101212065 A | 7/2008 |
| CN | 101752540 A | 6/2010 |
| CN | 102569886 A | 7/2012 |
| CN | 102569896 A | 7/2012 |
| CN | 102751530 A | 10/2012 |
| EP | 0 281 352 A2 | 9/1988 |
| EP | 0 529 802 A1 | 3/1993 |
| EP | 0 689 260 A1 | 12/1995 |
| EP | 0 875 951 A1 | 11/1998 |
| EP | 0 924 789 A1 | 6/1999 |
| EP | 0 971 432 A1 | 1/2000 |
| EP | 2 309 572 A1 | 4/2011 |
| EP | 2 333 886 A1 | 6/2011 |
| FR | 2 677 636 B1 | 9/1995 |
| JP | S57-147869 A | 9/1982 |
| JP | S62-213064 A | 9/1987 |

(56) References Cited

FOREIGN PATENT DOCUMENTS

| | | |
|---|---|---|
| JP | S63-6752 A | 1/1988 |
| JP | H06-238830 A | 8/1994 |
| JP | H06-275313 A | 9/1994 |
| JP | H08-279357 A | 10/1996 |
| JP | H09-17441 A | 1/1997 |
| JP | H10-248175 A | 9/1998 |
| JP | H11-40202 A | 2/1999 |
| JP | H11-67275 A | 3/1999 |
| JP | 2000-030750 A | 1/2000 |
| JP | 2000-311721 A | 11/2000 |
| JP | 2002-135989 A | 5/2002 |
| JP | 2003-123743 A | 4/2003 |
| JP | 2004-103548 A | 4/2004 |
| JP | 2005-174653 A | 6/2005 |
| JP | 2006-024415 A | 1/2006 |
| JP | 2010-102895 A | 5/2010 |
| JP | 2011-138675 A | 7/2011 |
| KR | 20040000129 A | 1/2004 |
| KR | 20040011629 A | 2/2004 |
| KR | 20040033678 A | 4/2004 |
| WO | WO 90/02351 A1 | 3/1990 |
| WO | WO 97/44840 A1 | 11/1997 |
| WO | WO 98/35397 A1 | 8/1998 |
| WO | WO 99/03162 A1 | 1/1999 |
| WO | WO 99/19931 A1 | 4/1999 |
| WO | WO 99/33125 A1 | 7/1999 |
| WO | WO 99/33131 A1 | 7/1999 |
| WO | WO 00/46870 A1 | 8/2000 |
| WO | WO 01/39303 A1 | 5/2001 |
| WO | WO 01/47088 A2 | 6/2001 |
| WO | WO 01/57943 A1 | 8/2001 |
| WO | WO 02/67344 A2 | 8/2002 |
| WO | WO 02/95849 A2 | 11/2002 |
| WO | WO 2005/069405 A2 | 7/2005 |
| WO | WO 2005/069409 A2 | 7/2005 |
| WO | WO 2005/083829 A2 | 9/2005 |
| WO | WO 2005/095504 A1 | 10/2005 |
| WO | WO 2007/111988 A2 | 10/2007 |
| WO | WO 2008/070059 A2 | 6/2008 |
| WO | WO 2012/161989 A1 | 11/2012 |

OTHER PUBLICATIONS

Xiong et al., Effect of LiBOB as additive on electrochemical properties of lithium-sulfur batteries. Ionics. 2012;18:249-54. Epub Sep. 27, 2011.

Nitta et al., Li-ion battery materials: present and future. Materials Today. Jun. 2015;18(5):252-64. Review.

Alamgir et al., Room Temperature Polymer Electrolytes. Industrial Chemistry Library, vol. 5, Lithium Batteries: New Materials, Developments and Perspectives, Chapter 3. Elsevier, Amsterdam. 1994:93-136.

Aurbach, Nonaqueous Electrochemistry, Chapter 6—The Electrochemical Behavior of Active Metal Electrodes in Nonaqueous Solutions. Marcel Dekker, New York. 1999:289-366.

Cheon et al., Rechargeable Lithium Sulfur Battery: II. Rate Capability and Cycle Characteristics. J Electrochem Soc. 2003;150:A800-5.

Chu et al., High Performances S-type Cathode. Proceedings of the $12^{th}$ Annual Battery Conference. Applications and Advances. 1997:133-4.

Dominey, Current State of the Art on Lithium Battery Electrolytes. Industrial Chemistry Library, vol. 5, Lithium Batteries: New Materials, Developments and Perspectives, Chapter 4. Elsevier, Amsterdam. 1994:137-65.

Gauthier et al., Large Lithium Polymer Battery Development The Immobile Solvent Concept. J Power Sources. 1995;54:163-9.

Golovin et al., Applications of Metallocenes in Rechargeable Lithium Batteries for Overcharge Protection. J Electrochem Soc. 1992;139:5-10.

Handbook of Batteries. Linden, $2^{nd}$ Edition. Chapter 14. McGraw-Hill, New York. 1995:75-6.

Handbook of Batteries. Linden, $2^{nd}$ Edition. Chapter 3. McGraw-Hill, New York. 1995:18-9.

Narayanan et al., Analysis of Redox Additive-Based Overcharge Protection for Rechargeable Lithium Batteries. J Electrochem Soc. 1991;138:2224-9.

Nishio et al., Discharge Characteristics of Manganese Dioxide/Lithium Cells in Various Electrolyte Solutions. J Power Sources. 1995;55:115-7.

Peled et al., Lithium-Sulfur Battery: Evaluation of Dioxolane-Based Electrolytes. J Electrochem Soc. 1989;136:1621-5.

Peled et al., The Electrochemical Behavior of Alkali and Alkaline Earth Metals in Nonaqueous Battery Systems. J Electrochem Soc. 1979;126:2047-51.

Rao et al., Effect of Sulfur Impurities on Li/TiS2 Cells. J Electrochem Soc. 1981;128:942-5.

Richardson et al., Overcharge Protection for Rechargeable Lithium Polymer Electrolyte Batteries. J Electrochem Soc. 1996;143:3992-6.

Zhang, A review on electrolyte additives for lithium-ion batteries. Journal of Power Sources. 2006;162:1379-94. Epub Oct. 10, 2006.

Zhuang et al., The Reaction of Lithium with Carbon Dioxide Studied by Photoelectron Spectroscopy. Surface Science. Nov. 1998;418(1):139-49.

U.S. Appl. No. 15/409,410, filed Jan. 18, 2017, Liao et al.
U.S. Appl. No. 15/429,439, filed Feb. 10, 2017, Liao et al.
U.S. Appl. No. 16/016,985, filed Jun. 25, 2018, Liao et al.

* cited by examiner

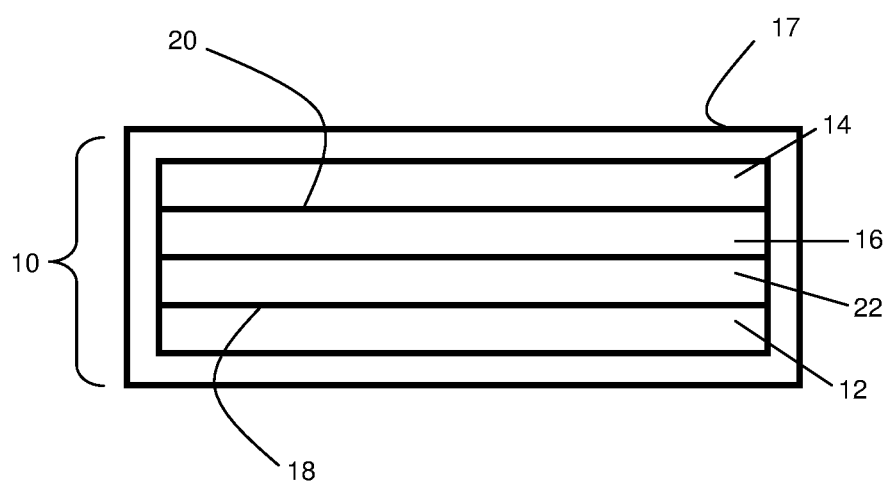

ELECTROLYTE MATERIALS FOR USE IN ELECTROCHEMICAL CELLS

RELATED APPLICATIONS

This application is a continuation of U.S. patent application Ser. No. 13/216,538, filed Aug. 24, 2011, which claims priority under 35 U.S.C. § 119(e) to U.S. Provisional Patent Application Ser. No. 61/376,559, filed Aug. 24, 2010, which are incorporated herein by reference in their entirety for all purposes.

FIELD OF INVENTION

Electrolyte materials for use in electrochemical cells, electrochemical cells comprising the same, and methods of making such materials and cells are generally described. In some embodiments, the materials, processes, and uses described herein relate to electrochemical cells comprising sulfur and lithium such as, for example, lithium sulfur batteries.

BACKGROUND

Lithium compound containing electric cells and batteries containing such cells are modern means for storing energy. They exceed conventional secondary batteries with respect to capacity and life-time and, in many times, use of toxic materials such as lead can be avoided. However, in contrast to conventional lead-based secondary batteries, various technical problems have not yet been solved.

Secondary batteries based on cathodes based on lithiated metal oxides such as $LiCoO_2$, $LiMn_2O_4$, and $LiFePO_4$ are well established, see, e.g., EP 1 296 391 A1 and U.S. Pat. No. 6,962,666 and the patent literature cited therein. Although the batteries mentioned therein exhibit advantageous features, they are limited in capacity. For that reason, numerous attempts have been made to improve the electrode materials. Particularly promising are so-called lithium sulfur batteries. In such batteries, lithium will be oxidized and converted to lithium sulfides such as $Li_2S_{8-a}$, a being a number in the range from zero to 7. During recharging, lithium and sulfur will be regenerated. Such secondary cells have the advantage of a high capacity.

A particular problem with lithium sulfur batteries is the thermal runaway which can be observed at elevated temperatures between, e.g., 150 to 230° C. and which leads to complete destruction of the battery. Various methods have been suggested to prevent such thermal runaway such as coating the electrodes with polymers. However, those methods usually lead to a dramatic reduction in capacity. The loss in capacity has been ascribed—amongst others—to formation of Lithium dendrites during recharging, loss of sulfur due formation of soluble lithium sulfides such as $Li_2S_3$, $Li_2S_4$ or $Li_2S_6$, polysulfide shuttle, change of volume during charging or discharging and others.

In WO 2008/070059 various materials are disclosed for coating electrodes for lithium sulfur batteries. However, the thermal runaway problem has not been solved satisfactorily.

SUMMARY OF THE INVENTION

Electrolyte materials for use in electrochemical cells, electrochemical cells comprising the same, and methods of making such materials and cells, are provided. The subject matter of the present invention involves, in some cases, interrelated products, alternative solutions to a particular problem, and/or a plurality of different uses of one or more systems and/or articles.

In one aspect, an electrochemical cell (e.g., a lithium battery) is provided. In some embodiments, the electrochemical cell (e.g., lithium battery) comprises an anode comprising lithium as the anode active species; a cathode comprising a cathode active species; and an electrolyte comprising a non-fluid material positioned between the anode and the cathode, and an auxiliary material absorbed by the non-fluid material, the non-fluid material having a surface in contact with a surface of the anode. In some embodiments, the non-fluid material, in combination with the absorbed auxiliary material, has a yield strength greater than that of lithium metal. In some embodiments, the cathode comprising the cathode active species may be supported by a cathode current collector.

In some embodiments, the electrochemical cell comprises an anode comprising lithium as the anode active species; a cathode comprising a cathode active species; and an electrolyte comprising a non-fluid material, wherein, when the electrochemical cell is configured for use, the electrolyte has a yield strength greater than that of lithium metal.

In some embodiments, the electrochemical cell comprises:
(A) an electrode containing sulfur
(B) an electrode containing lithium or a lithium alloy,
(C) at least one organic (co)polymer selected from polyethersulfones, said polyethersulfone being in the gel state,
(D) at least one organic solvent, and
(E) at least one salt of lithium.

In some embodiments, the electrochemical cell comprises an anode comprising lithium as the active anode species; a cathode comprising a cathode active species; and an electrolyte comprising a non-fluid (e.g., solid) material, wherein when the electrolyte is configured such that the electrochemical cell can be cycled at a temperature of up to about 130° C. without experiencing thermal runaway.

In some embodiments, a process for making an electrochemical cell is described. The process for making the electrochemical cell can comprise providing lithium or lithium alloy, which may be deposited on a substrate, depositing a solution of at least one polyethersulfone in an organic solvent on said lithium or lithium alloy, adjusting the residual solvent content of polyethersulfone to a range of from 0.01 to 25% by weight, and treating said deposited polyethersulfone with a solution of at least one salt of lithium in at least one organic solvent.

Furthermore, in another aspect, the present invention relates to a method for making electrodes. Furthermore, in yet another aspect, the present invention relates to a process for using inventive batteries.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every FIGURE, nor is every component of each embodiment of the invention shown where illustration is not necessary to allow those of ordinary skill in the art to understand the invention. In the figures:

FIG. 1 includes an exemplary schematic diagram of an electrochemical cell, according to one set of embodiments.

DETAILED DESCRIPTION

Electrolyte materials for use in electrochemical cells, electrochemical cells comprising the same, and methods of making such materials and cells, are generally described. In some embodiments, the materials, processes, and uses described herein relate to electrochemical cells comprising sulfur and lithium such as, for example, lithium sulfur batteries. The electrolyte can comprise a polymeric material and, in some cases, an absorbed auxiliary material. For example, the electrolyte material can be capable of forming a gel, and the auxiliary material can comprise an electrolyte solvent. In some instances, the electrolyte material can comprise at least one organic (co)polymer selected from polyethersulfones, polyvinylalcohols (PVOH) and branched polyimides (HPI). The non-fluid material in the electrolyte, when configured for use, can, alone or in combination with the optional absorbed auxiliary material, have a yield strength greater than that of lithium metal, in some embodiments.

One objective of the present invention is to provide an electrochemical cell in which thermal runaway is mitigated while maintaining the capacity of the cell. The inventors have discovered, within the context of the invention, that this objective can be met by incorporating the materials described herein (e.g., polymeric materials such as those capable of forming gels) into the electrolyte of the electrochemical cell.

The materials for use in the electrolyte described herein can, in some embodiments, withstand the application of a force to the electrochemical cell without sacrificing system performance. U.S. Patent Publication No. 2010/0035128 to Scordilis-Kelley et al. filed on Aug. 4, 2009, entitled "Application of Force in Electrochemical Cells," describes the application of forces in electrochemical cells for improved electrode chemistry, morphology, and/or other characteristics, which can improve performance. The present invention involves, in one aspect, the recognition that the use of particular materials in the electrolyte can allow for the application of a force to an electrochemical cell without sacrificing the structural integrity of the cell. In addition, the materials for use in the electrolyte described herein can withstand repeated charging and discharging of the electrochemical cell in which it is located, without producing a short circuit within the cell (e.g., due to dissolution and re-plating of electrode materials).

The inventive electrochemical cell arrangements and materials described herein can be used in primary batteries or in secondary batteries, which can be charged and discharged numerous times. In some embodiments, the materials, systems, and methods described herein can be used in association with lithium batteries (e.g., lithium-sulfur batteries). According to the present invention the term "electrochemical cell" comprises primary and secondary electrochemical cells. An electrochemical cell comprises at least two electrodes, the cathode and the anode. The cathode is the positive electrode, the anode is the negative electrode. According to the present invention the cathode refers to the electrode where the reduction takes place during discharge. The anode refers to the electrode where oxidation takes place during discharge.

Inventive batteries can contain electrochemical cells that are different or identical.

Although the present invention can find use in a wide variety of electrochemical devices, an example of one such device is provided in FIG. 1 for illustrative purposes only. FIG. 1 includes a schematic illustration of an electrochemical cell 10 comprising a cathode 12 and an anode 14. In addition, the electrochemical cell comprises electrolyte 16. The electrolyte can include one or more components in electrochemical communication with the cathode and the anode. While the anode, cathode, and electrolyte in FIG. 1 are shown as having a planar configuration, other embodiments may include non-planar configurations (e.g., cylindrical, serpentine, etc.). In the set of embodiments illustrated in FIG. 1, electrochemical cell 10 also includes a housing structure 17.

In some embodiments, cathode 12 and/or anode 14 can comprise at least one active surface. As used herein, the term "active surface" is used to describe a surface of an electrode that is in physical contact with the electrolyte and at which electrochemical reactions may take place. For example, cathode 12 can include cathode active surface 18 and/or anode 14 can include anode active surface 20.

Of course, the orientation of the components can be varied, and it should be understood that there are other embodiments in which the orientation of the layers is varied. Additionally, non-planar arrangements, arrangements with proportions of materials different than those shown, and other alternative arrangements are useful in connection with the present invention. A typical electrochemical cell also would include, of course, current collectors, external circuitry, and the like. Those of ordinary skill in the art are well aware of the many arrangements that can be utilized with the general schematic arrangement as shown in the figures and described herein.

The cathode can comprise a variety of cathode active materials. As used herein, the terms "cathode active material" and "cathode active species" both refer to any electrochemically active species associated with the cathode. For example, the cathode may comprise a sulfur-containing material, wherein sulfur is the cathode active material In one embodiment of the present invention, cathode 12 contains from about 20% to about 90% sulfur or from about 50% to 80% sulfur, by weight. In some embodiments, the cathode active species comprises elemental sulfur.

In addition to the cathode active material (e.g., sulfur), cathode 12 can further contain a binder. In some embodiments, the binder can be a polymeric binder such as polyvinyl alcohol, polyacrylonitrile, polyvinylidene fluoride, polyvinyl fluoride, polytetrafluoroethylene, copolymers from tetrafluoroethylene and hexafluoro propylene, copolymers from vinylidene fluoride and hexafluoro propylene or copolymers from vinylidene fluoride and tetrafluoroethylene. In some embodiments of the present invention, cathode 12 contains from about 1% to about 20% binder, from about 1% to about 10% binder, or from about 1% to about 5% binder, by weight.

For the purpose of the present invention, vinylidene fluoride can also be referred to as vinylidene difluoride, and polyvinylidene fluoride can also be referred to as polyvinylidene difluoride.

The cathode can further comprise a conductivity enhancing material. In some embodiments, the cathode can contain carbon in an electrically conductive form such as graphite, carbon fibers, carbon nanotubes, carbon black, and/or soot (e.g., lamp soot or furnace soot). In one embodiment of the present invention, cathode 12 contains from about 10% to about 45%, by weight, conductivity enhancing material (e.g., carbon in its electricity conducting phase), or from about 20% to about 40% by weight.

Referring back to FIG. 1, the electrochemical cell can also comprise an anode 14. The anode may comprise a variety of anode active materials. As used herein, the terms "anode active material" and "anode active species" both refer to any electrochemically active species associated with the anode. For example, the anode may comprise a lithium-containing material, wherein lithium is the anode active material. In some embodiments, the anode active species comprises lithium metal. In some embodiments, the anode active species comprises a lithium alloy.

The use of lithium in rechargeable batteries is known. Lithium can be contained as one film or as several films, optionally separated by a ceramic material. Suitable ceramic materials include silica, alumina, or lithium containing glassy materials such as lithium phosphates, lithium aluminates, lithium silicates, lithium phosphorous oxynitrides, lithium tantalum oxide, lithium aluminosulfides, lithium titanium oxides, lithium silcosulfides, lithium germanosulfides, lithium aluminosulfides, lithium borosulfides, and lithium phosphosulfides, and combinations of two or more of the preceding.

Suitable lithium alloys for use in the embodiments described herein can include alloys of lithium and aluminum, magnesium, silicium and/or tin.

Referring back to FIG. 1, electrochemical cell 10 can also include an electrolyte 16, positioned between cathode 12 and anode 14. The electrolyte can include, in some embodiments, a non-fluid material positioned between the anode and the cathode. As used herein, the term "fluid" generally refers to a substance that tends to flow and to conform to the outline of its container during the time over which it is added to the container. Examples of fluids include liquids and gases.

In some cases, the electrolyte can also include an auxiliary material absorbed by the non-fluid material. A first material is said to be "absorbed" in a second material when the first material does not freely flow through the second material, but rather, is retained within the second material over the time scale in which it is added to the second material, i.e., it is substantially retained by the second material at least (and in many embodiments, significantly longer) over a period of time equivalent to the time consumed by fully adding/integrating the first material to the second material. "Retained," in this context, means held within the second material by chemical attraction including hydrogen bonding, Van der Waals interactions, ionic bonding, and the like.

In some embodiments, the non-fluid material within the electrolyte can be electrochemically active (i.e., can facilitate the exchange of ions between the anode and the cathode). In some cases, the non-fluid material within the electrolyte is not electrochemically active, and the electrolyte includes an electrochemically active auxiliary material (e.g., an electrochemically active electrolyte fluid). In still other embodiments, the electrolyte can include an electrochemically active non-fluid material and an electrochemically active auxiliary material.

The non-fluid material may comprise a polymer and/or a copolymer, in some cases an organic polymer and/or copolymer. According to some embodiments, the polymers and copolymers are selected from polyvinylalcohols and copolymers thereof, polyethersulfones and copolymers thereof and branched polyimides and copolymers thereof.

The electrolyte can include a gel, in some cases. As used herein, the term "gel" refers to a three-dimensional network comprising a liquid and a binder component, in which the liquid is entrained by and not allowed to flow through the binder. Gels can be formed when liquids are entrained within a three-dimensional network of solids upon applying the liquid to the solid network. In some cases, the three-dimensional network within a gel can comprise a liquid entrained within a polymer (e.g., a cross-linked polymer). One of ordinary skill in the art would be capable of determining the difference between a gel and other combinations of a solid and a fluid (e.g., a porous separator and a liquid solvent) by measuring, for example, the absorption stiffness of the gel via a dibutyl phthalate (DBP) uptake test. For this test, a dry sample of the binder material is weighed. The weighed sample is immersed in DBP for 30 min. The excess DBP is removed by absorbent paper (e.g. kimwipe commercially available from Kimberly-Clark) and the sample is weighed again. Generally, upon exposure of the binder component of a gel to a liquid, the weight of the gel will increase, while the weight of a porous separator will not substantially increase. In some embodiments, the binder component of the gel is able to take up liquid in the substantial absence of pores greater than about 10 microns or greater than about 1 micron. The binder component of a gel can be substantially free of pores in some cases.

In the context of the present invention, polyethersulfones are defined as polymeric materials that exhibit $SO_2$ groups (sulfonyl groups) and oxygen atoms that form part of ether groups in their constitutional repeating units. Polyethersulfones can be aliphatic, cycloaliphatic or aromatic polyethersulfones.

In one embodiment of the present invention, polyethersulfones are selected from polyethersulfones that can be described by the following formula:

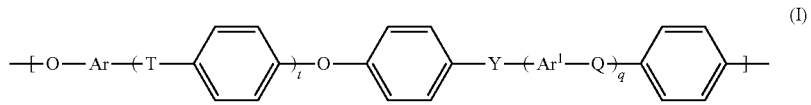

(I)

The integers can have the following meanings:
t, q independently 0, 1, 2 or 3,
Q, T, Y: each independently a chemical bond or group selected from —O—, —S—, —$SO_2$—, S=O, C=O, —N=N—, —$R^1$C=$CR^2$—, —$CR^3R^4$—, where $R^1$ and $R^2$ are each independently a hydrogen atom or a $C_1$-$C_{12}$-alkyl group, and $R^3$ and $R^4$ are different or identical and independently a hydrogen atom or a $C_1$-$C_{12}$-alkyl, $C_1$-$C_{12}$-alkoxy or $C_6$-$C_{18}$-aryl group, where $R^3$ and $R^4$ alkyl, alkoxy, or aryl can be substituted independently by fluorine and/or chlorine or where $R^3$ and $R^4$, combine with the carbon atom linking them to form $C_3$-$C_{12}$-cycloalkyl optionally substituted by one or more $C_1$-$C_6$-alkyl groups, at least one of Q, T and Y being other than —O— and at least one of Q, T and Y being —$SO_2$—, and Ar, $Ar^1$: independently $C_6$-$C_{18}$-arylene optionally substituted by $C_1$-$C_{12}$-alkyl, $C_6$-$C_{18}$-aryl, $C_1$-$C_{12}$-alkoxy, or halogen.

Q, T and Y can therefore each independently be a chemical bond or one of the above mentioned atoms or groups, in which case "a chemical bond" is to be understood as meaning that, in this case, the left-adjacent and right-adjacent groups are directly linked to each other via a chemical bond. In accordance with the present invention, at least one element of Q, T and Y is other than —O— and at least one element from Q, T and Y is —$SO_2$—. In a one set of embodiments, Q, T and Y are each independently —O— or —$SO_2$—.

Suitable $C_1$-$C_{12}$-alkyl groups comprise linear and branched, saturated alkyl groups having from 1 to 12 carbon atoms. The following radicals may be included in particular: $C_1$-$C_6$-alkyl, such as methyl, ethyl, n-propyl, iso-propyl, n-butyl, sec-butyl, 2- or 3-methylpentyl and longer-chain radicals such as non-branched heptyl, octyl, nonyl, decyl, undecyl, lauryl, and the singly or multiply branched analogues thereof.

When Ar and/or $Ar^1$ is/are substituted with $C_1$-$C_{12}$-alkoxy, the above-defined alkyl groups having from 1 to 12 carbon atoms are especially useful as the alkyl component in the alkoxy groups. Suitable cycloalkyl groups comprise in particular $C_3$-$C_{12}$-cycloalkyl groups, for example cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, cyclopentylpropyl, cyclopentylbutyl, cyclopentylpentyl, cyclopentylhexyl, cyclohexylmethyl, cyclohexyldimethyl, cyclohexyltrimethyl.

Useful $C_6$-$C_{18}$-arylene groups Ar and $Ar^1$ include in particular phenylene groups, especially 1,2-, 1,3- and 1,4-phenylene, naphthylene groups, especially 1,6-, 1,7-, 2,6- and 2,7-naphthylene, and also the bridging groups derived from anthracene, phenanthrene and naphthacene. In some cases, $Ar^1$ is unsubstituted $C_6$-$C_{12}$-arylene, i.e., phenylene, especially 1,2-, 1,3- or 1,4-phenylene, or naphthylene.

In some embodiments, the polyethersulfone can be a polysulfone, e.g. alkylated, such as methylated polycondensation products of the disodium salt of bisphenol A and 4,4'-dichlorodiphenyl sulfone,

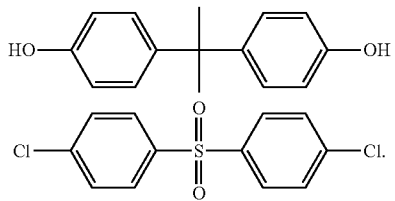

Further examples of polyethersulfones are polyarylethersulfones, such as polycondensation products of

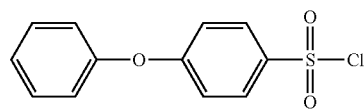 [SMILES: O=S(=O)(Cl)c1ccc(Oc2ccccc2)cc1]

with HCl having been split of during polycondensation or the polycondensation products of 4,4'-dihydroxydiphenyl sulfone or its disodium salt and 4,4'-dichlorodiphenyl sulfone

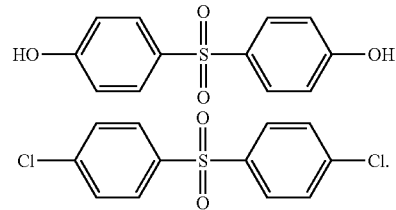

Further examples of polyethersulfones are polyphenylsulfones, especially those made from 4,4'-biphenol and 4,4'-dichlorodiphenyl sulfone.

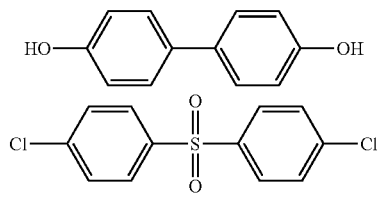

Hydroxyl groups in polyethersulfone can be free hydroxyl groups, the respective alkali metal salts, or alkyl ethers such as the respective methyl ethers.

In some embodiments, polyethersulfone can be a linear polyethersulfone.

In a special embodiment of the present invention, polyethersulfone can be selected from branched polyethersulfones.

In one embodiment, the electrolyte material contains a mixture or blend of at least two of the polyethersulfones mentioned above, or a blend of polyethersulfone and an additional (co)polymer. In another embodiment the electrode (B) comprises a blend from polyethersulfone (C) and an additional (co)polymer (F).

In one embodiment of the present invention, polyether sulfone is applied as a blend from polyethersulfone and an additional (co)polymer. Suitable (co)polymers can be any (co)polymers that are compatible with the respective polyethersulfone.

In some embodiments of the present invention, the additional (co)polymer is selected from one or more sulfonated (co)polymers. In the context of the present invention, the term "sulfonated (co)polymers" refers to (co)polymers that bear an average of at least one $SO_3^-$-group per molecule of additional (co)polymer. In some cases, the sulfonated (co)polymer can bear an average of at least at least two $SO_3^-$-groups per molecule of additional (co)polymer. Said $SO_3^-$-group (sulfonic acid groups) may be free acid groups or salts, such as alkali metal salts or ammonium salts or salts of organic amines including alkanol amines.

In one embodiment of the present invention, the additional (co)polymer has a degree of sulfonation of up to 60%, or up to 55%. Generally, the term "degree of sulfonation" refers to the number of sulfonic acid groups per molecule of constitutional repeating unit.

In some instances, the sulfonated (co)polymers can include sulfonated polyketones, such as, for example, sulfonated polyether ketones and sulfonated polyether ether ketones (s PEEK).

Polyketones in the context of the present invention refer to (co)polymers that exhibit C=O-groups (keto groups) in their constitutional repeating units. Polyketones can be aliphatic, cycloaliphatic or aromatic. Examples include structural elements of the formula

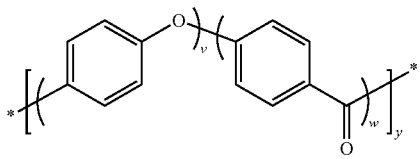

with y being in the range of from 2 to 100, and v and w being selected from 1 and 2.

Polyketones with v=w=1 are referred to as polyetherketone. In some embodiments, the polyetherketones can be obtained from polycondensation of 4-phenoxybenzoyl chloride and diphenyl ether.

Polyketones with v=2 and w=1 are referred to as polyether ether ketones (PEEK).

Polyketones with v=1 and w=2 are referred to as polyether ketone ketones (PEKK). In some embodiments, PEKK can be obtained from polycondensation of the dichloride of terephthalic acid with diphenyl ether.

Sulfonation of polyketones is known per se, see, e.g., US 2007/0117958 and literature cited therein, which is incorporated herein by reference in its entirety for all purposes.

Other (co)polymers for use in the embodiments described herein are selected from polyethylene oxide (200K-8M), esters of polyethylene oxide (e.g., acetates, benzoates, and/or propionates), and/or polyalkylvinylethers, e.g., poly-$C_1$-$C_{20}$-alkylvinylethers such as polymethylvinylethers.

In one embodiment of the present invention, polyethersulfone has a molecular weight $M_w$ of from about 25,000 to about 40,000 g/mol, from about 28,500 to about 35,000 g/mol, or from about 32,000 to about 34,000 g/mol.

In one embodiment of the present invention, polyethersulfone is cross-linked with inorganic or organic filler. Cross-linking can be achieved, e.g., by irradiation such as UV/vis irradiation, by γ-irradiation, electron beams (e-beams) or by heating (thermal cross-linking). In the context of the present invention, the term "cross-linking" of polyethersulfone will not be limited to classical cross-linking but will also include splitting of and recombining of chains of polyethersulfone. Filler, as well as procedures and means for cross-linking, will be described in more detail below. In one embodiment of the present invention, polyethersulfone exhibits a polydispersity index $M_w/M_n$ of from about 3 to about 5, or from about 4 to about 5.

Average molecular weight $M_n$ and $M_w$ can be determined by conventional means such as gel permetion chromatography (GPC).

Polyethersulfone can be incorporated in inventive electrochemical cells in its gel state. When used in such a state, an auxiliary material such as a solvent can be absorbed by the polyethersulfone. In some embodiments, the solvent can include at least one organic solvent. In some embodiments, the solvent can comprise an aprotic organic solvent. Suitable organic solvents for converting polyethersulfone into its gel state can be selected from organic amides such as N—$C_1$-$C_{10}$-alkylpyrrolidones, N—$C_5$-$C_8$-cycloalkylpyrrolidones, in particular N-methylpyrrolidone, N-ethylpyrrolidone, and N-cyclohexylpyrrolidone. Further solvents are mentioned below.

According to one aspect of the present invention, the electrolyte of the inventive electrochemical cell comprises polyethersulfone (C) in its gel state, the at least one organic solvent (D), at least one salt of lithium (E), optionally additional (co)polymer (F), and optionally organic or inorganic filler (G). Preferably the polyethersulfone is transformed into the gel state by incorporation of the at least one of organic solvent (D) which contains at least one salt of lithium (E).

In one embodiment of the present invention, the electrolyte material (e.g., polyethersulfone or a blend of polyethersulfone and an additional (co)polymer) can be transformed into its gel state using mixtures of solvents, in particular mixtures comprising N—$C_1$-$C_{10}$-alkylpyrrolidones and/or N—$C_5$-$C_8$-cycloalkylpyrrolidones.

In one embodiment of the present invention, the electrolyte (which can include polyethersulfone or a blend of polyethersulfone and additional (co)polymer(s), polyvinylalcohol (PVOH) or a blend of PVOH and additional (co)polymer(s) or branched polyimide (HPI)) contains from about 1% to about 20% solvent, by weight, or from about 10% to about 15% solvent, by weight.

In one embodiment of the present invention, the electrolyte is arranged in one or more layers with a thickness in the range of from about 1 nm to about 50 μm, from about 5 μm to about 15 μm, or from about 7 μm to about 12 μm.

The electrolyte can have one or more mechanical properties that can improve device performance during operation of the electrochemical cell. In some embodiments, the electrolyte can have a yield strength greater than the yield strength of lithium metal. In some cases, the electrolyte material does not include an auxiliary material such as a solvent, in which case the yield strength of the non-fluid material in the electrolyte (e.g., one or more polyethersulfones, one or more branched polyimide, polyvinylalcohol (PVOH) or a blend of PVOH and additional (co)polymer(s) and, optionally, other non-fluid materials such as additional (co)polymer(s) and/or filler(s)) positioned between the anode and the cathode can be greater than the yield strength of lithium metal. In instances where the electrolyte comprises an auxiliary material such as a solvent, the yield strength of the combination of the non-fluid material and the auxiliary material positioned between the anode and the cathode can be greater than the yield strength of lithium metal. It should be understood that the yield strength of any optional separator is not included in the determination of the yield strength of the electrolyte. In some embodiments, the electrolyte (e.g., the non-fluid material, alone or in combination with an absorbed auxiliary material, for example, in the configurations described in the preceding paragraph), has a yield strength of at least about 80 Newtons/cm$^2$, at least about 100 Newtons/cm$^2$, or at least about 120 Newtons/cm$^2$. In other embodiments, the yield strength of the electrolyte (e.g., the non-fluid material, alone or in combination with an absorbed auxiliary material, for example, in the configurations described in the preceding paragraph), may be at least 10% higher than the yield strength of lithium metal, at least 20% higher, at least 50% higher, at least 100% higher, or at least 200% higher than the yield strength of lithium.

The yield strength is the stress at which a material exhibits a specified permanent deformation (sometimes referred to as plastic deformation) and is a practical approximation of the elastic limit. Beyond the elastic limit, permanent deformation will occur. The lowest stress at which permanent deformation during extension can be measured is defined as yield stress according to the present invention. One of ordinary skill in the art would be capable of determining the yield strength of a material by, for example, taking a sample with a fixed cross-section area, and pulling it with a controlled, gradually increasing force until the sample changes shape or breaks. Longitudinal and/or transverse strain is recorded using mechanical or optical extensometers. Testing machines for determining the yield strength are commercially available, e.g. from Instron®.

The yield stress Y is correlated with the hardness value H for a pyramid indenter producing plastic flow. In many cases, the hardness H correlates with the yield stress Y, with the hardness H corresponding to approximately three times the yield stress Y ("Concise Encyclopedia of polymer science and engineering", J. Kroschwitz editor 1990 John Wiley & Sons, page 441). Hardness, or resistance to local deformation, generally refers to the ease with which a material can be indented, drilled, sawed, or abraded. It generally involves a complex combination of properties, including yield strength, elastic modulus, and strain-hardening capacity. Typically hardness is measured by static penetration of the material with a standard indenter exerting a known force, by dynamic rebound of a standard indenter of known mass dropped from a standard height, or by scratching with a standard pointed tool exerting a known force. One of ordinary skill in the art can apply these measurements for gel-polymer films and metallic lithium and compare their relative hardness and/or yield strength.

In some instances, the electrolyte (e.g., the non-fluid material, alone or in combination with an absorbed auxiliary material, for example, in the configurations described in the preceding paragraph) has a thickness of at least about 5 µm, at least about 10 µm, at least about 25 µm, between about 1 µm and about 500 µm between about 5 µm and about 100 µm, or between about 5 microns and about 20 microns.

In some embodiments, the electrolyte, when configured for use in an electrochemical cell, can have a yield strength and/or thickness within any of the ranges outlined above. Generally, an electrolyte is configured for use in an electrochemical cell when it includes all materials that would be within the boundaries of the electrolyte (e.g., non-fluid material (e.g., solid material), auxiliary material such as a solvent), is packaged as it would be during use, and is under conditions it would be exposed to (e.g., temperature, pressure, etc.) during use. Generally, the electrochemical cells described herein that are configured for use are capable of exhibiting the ionic conductivities and electrical conductivities necessary to charge and discharge the cell at the desired level. As a specific example, in some cases, the electrolyte can comprise a gel comprising a non-fluid material (e.g., comprising one or more polyethersulfone, one or more branched polyimide, polyvinylalcohol or a blend of PVOH and additional (co)polymer(s)) and an auxiliary material. The electrolyte gel can be positioned between the anode and the cathode such that the non-fluid material has a surface in contact with a surface of the anode. In some cases, a second surface of the electrolyte gel can be in contact with the cathode, or in contact with a separator between the electrolyte gel and the cathode. In some embodiments, the electrolyte gel, when configured for use, can have a yield strength greater than the yield strength of lithium metal (e.g., at least about 80 Newtons/cm$^2$, at least about 100 Newtons/cm$^2$, or at least about 120 Newtons/cm$^2$). The yield strength of the electrolyte gel, when configured for use may be at least 10% higher than the yield strength of lithium metal, at least 20% higher, at least 50% higher, at least 100% higher, or at least 200% higher than the yield strength of lithium. In some instances, the electrolyte gel can have a thickness of at least about 5 µm, at least about 10 µm, at least about 25 µm, between about 1 µm and about 500 µm between about 5 µm and about 100 µm, or between about 5 µm and about 20 µm.

Examples of polymer electrolyte gels having a yield strength higher than lithium include, for example, materials (e.g., films) based on non-porous polyvinylalcohol (PVOH) as a non-fluid material swollen with a solvent having affinity to PVOH such as, for example, dimethylacetamide (DMAc), N-methylpyrolidone (NMP), dimethylsulfoxide (DMSO), dimethylformamide (DMF), sulfolanes and sulfones. The PVOH may be swollen in solvent mixture comprising a solvent having affinitiy to PVOH and also solvents having no affinity to PVOH (so-called non-solvents) like 1,2.dimethoxyethane (DME), diglyme, triglyme, 1,3-dioxolane (DOL), THF, 1,4-dioxane, cyclic and linear ethers, esters (carbonates as dimethylcarbonate and ethylene carbonate), acetals and ketals. The solvent or solvent mixture may contain one or more lithium salts such as, for example, $(CF_3SO_2)_2NLi$ (LiTFSI), $CF_3SO_3Li$, $LiNO_3$, LiBOB, $LiPF_6$, LiSCN, $LiClO_4$, LiI, LiBr, LiCl, $LiBF_4$ and further lithium salts mentioned elsewhere herein.

The polymer electrolyte gel comprising non-porous PVOH may be prepared by exposing the PVOH to the solvent/solvent mixture and swelling with the solvent/solvent mixture to an equilibrium concentration. For example, the solvent mixture for preparing the polymer electrolyte gel can comprise a mixture of a solvent like DMAc, NMP or DMSO with non-solvents like DME and DOL. The concentration of DMAc (NMP, DMSO) in the solvent mixture can be from 5 to 80 w %. Solvent uptake in the swollen PVOH can be in the range from 5 to 50 weight %. For instance, experiments have shown that PVOH exposed to mixture of 40 w % DMAc and 60 w % of Dioxane can uptake 19% of DMAc. Also PVOH can be swollen first with solvent and then exposed to the mixture of solvent, optionally non-solvent and electrolyte salt (e.g., lithium salt), in some embodiments. In some embodiments, PVOH can be coated as a film from a solution comprising a solvent, salt and other solvents, and dried to reduce solvent content in the gel-polymer to the desired level. Non-porous PVOH refers to a continuous polymer film/material based on PVOH substantially free of defects or porosity.

Other examples of polymer electrolyte gels having a yield strength higher than lithium are composites of non-porous PVOH and/or copolymers of PVOH with further (co) polymer(s) wherein the PVOH and/or copolymer of PVOH (and/or the further (co) polymer(s)) form a interpenetrating network wherein the PVOH/copolymer of PVOH is not swollen and the further (co) polymer(s) are swollen by a solvent or solvent mixture comprining solvents having affinity to the further (co) polymer(s) but having no or only low affinity to PVOH. Examples for the further (co) polymer(s) are polysulfones, polyethersulfones, polyethyleneoxides, polypropyleneoxides, polystyrene, polyvinylidene fluoride and polyalkyl vinyl ethers. The solvent/solvent mixtures used for swelling the further (co)polymers may comprise one or more lithium salts as described below.

According to another embodiment of the present invention, the non-fluid material may be selected from porous PVOH wherein the pores are filled with one or more non-solvents for PVOH. Examples for non-solvents for PVOH are mentioned above. The non-solvents may contain electrolyte salts, including those selected from the lithium salts mentioned below. Films of porous PVOH can be made through various techniques including, for example, coating with dispersed removable filler, phase separation with solvent/non-solvent precipitation, and slurry coating with dispersed inorganic fillers listed below. PVOH porous films exposed to non-solvents for PVOH do not generally form a gel. Porous PVOH refers to a continuous polymer film/material which has holes or pores. Porous PVOH can be determined by a test such as a solvent uptake (e.g., DBP uptake) test, a gas permeability test, or a mercury intrusion test.

Polymer electrolyte gels having yield strength higher than lithium may further be prepared from branched and hyperbranched polyimides. Hyperbranched polyimides are a subclass of branched polyimides. They are composed of highly branched macromolecules in which any linear subchain may lead in either direction to at least two other subchains. Herein, the term "branched polyimides" is intended to include branched and hyperbranched polyimides. The branched polyimides are, in some embodiments, selected from condensation products of (a) at least one polycarboxylic acid having at least 3 COOH groups per molecule or anhydride or ester thereof, and
(b) at least one compound, selected from
　(b1) at least one polyamine having on average more than two amino groups per molecule, and in some cases, also referred to as polyamine (b1), and in some cases from
　(b2) at least one polyisocyanate having on average more than two isocyanate groups per molecule, also referred to as polyisocyanate (b2).

Said polyimide is briefly referred to as a branched polyimide.

The branched polyimide can have a molecular weight $M_w$ in the range from 1,000 to 200,000 g/mol. In some embodiments, the branched polyimide can have a molecular weight $M_w$ in the range from 2,000 to 20,000 g/mol.

The branched polyimide can have at least two imide groups per molecule. In some embodiments, the branched polyimide can have at least 3 imide groups per molecule.

In one embodiment, the branched polyimide can have up to 1,000 imide groups per molecule. In some embodiments, the branched polyimide can have up to 660 per molecule.

In one embodiment, the recitation of the number of isocyanate groups or the number of COOH groups per molecule in each case denotes the mean value (number-average).

The branched polyimide can be composed of structurally and molecularly uniform molecules. In some embodiments, the branched polyimides comprise mixtures of molecularly and structurally differing molecules, for example, visible from the polydispersity $M_w/M_n$ of at least 1.4, and, in some cases, $M_w/M_n$ of 1.4 to 50, or 1.5 to 10. The polydispersity can be determined by known methods, in particular by gel permeation chromatography (GPC). A suitable standard is, for example, poly(methyl methacrylate) (PMMA).

In one embodiment, polyimide (B), in addition to imide groups which form the polymer backbone, comprises, terminally or in side chains, in addition at least three, at least six, or at least ten, terminal or side-chain functional groups. The functional groups in the branched polyimide can comprise anhydride and/or acid groups and/or free or capped NCO groups. In some embodiments, the branched polyimides have no more than 500 terminal or side-chain functional groups, or no more than 100 terminal or side-chain functional groups.

Alkyl groups such as, for example, methyl groups are therefore not a branching of a molecule of branched polyimide.

In some embodiments, polycarboxylic acids (a) include aliphatic, or in some embodiments aromatic. In some embodiments, polycarboxylic acids are selected that have at least three COOH groups per molecule, or the respective anhydrides, for example if they are present in low-molecular weight, that is to say, non-polymeric form. Polycarboxylic acids having three COOH groups in which two carboxylic acids groups are present as anhydride and the third as a free carboxylic acid can also be used.

In one embodiment, polycarboxylic acid (a) comprises a polycarboxylic acid having at least 4 COOH groups per molecule, or the respective anhydride.

Examples of polycarboxylic acids (a) and anhydrides thereof are 1,2,3-benzenetricarboxylic acid and 1,2,3-benzenetricarboxylic dianhydride, 1,3,5-benzenetricarboxylic acid (trimesic acid), including 1,2,4-benzenetricarboxylic acid (trimellitic acid), trimellitic anhydride and, in particular, 1,2,4,5-benzenetetracarboxylic acid (pyromellitic acid) and 1,2,4,5-benzenetetracarboxylic dianhydride (pyromellitic dianhydride), 3,3',4,4"-benzophenonetetracarboxylic acid, 3,3',4,4"-benzophenonetetracarboxylic dianhydride, in addition benzenehexacarboxylic acid (mellitic acid) and anhydrides of mellitic acid.

Other suitable polycarboxylic acids (a) and anhydrides thereof are mellophanic acid and mellophanic anhydride, 1,2,3,4-benzenetetracarboxylic acid and 1,2,3,4-benzenetetracarboxylic dianhydride, 3,3,4,4-biphenyltetracarboxylic acid and 3,3,4,4-biphenyltetracarboxylic dianhydride, 2,2,3,3-biphenyltetracarboxylic acid and 2,2,3,3-biphenyltetracarboxylic dianhydride, 1,4,5,8-naphthalenetetracarboxylic acid and 1,4,5,8-naphthalenetetracarboxylic dianhydride, 1,2,4,5-naphthalenetetracarboxylic acid and 1,2,4,5-naphthalenetetracarboxylic dianhydride, 2,3,6,7-naphthalenetetracarboxylic acid and 2,3,6,7-naphthalenetetracarboxylic dianhydride, 1,4,5,8-decahydronaphthalenetetracarboxylic acid and 1,4,5,8-decahydronaphthalenetetracarboxylic dianhydride, 4,8-dimethyl-1,2,3,5,6,7-hexahydronaphthalene-1,2,5,6-tetracarboxylic acid and 4,8-dimethyl-1,2,3,5,6,7-hexahydronaphthalene-1,2,5,6-tetracarboxylic dianhydride, 2,6-dichloronaphthalene-1,4,5,8-tetracarboxylic acid and 2,6-dichloronaphthalene-1,4,5,8-tetracarboxylic dianhydride, 2,7-dichloronaphthalene-1,4,5,8-tetracarboxylic acid and 2,7-dichloronaphthalene-1,4,5,8-tetracarboxylic dianhydride, 2,3,6,7-tetrachloronaphthalene-1,4,5,8-tetracarboxylic acid and 2,3,6,7-tetrachloronaphthalene-1,4,5,8-tetracarboxylic dianhydride, 1,3,9,10-phenanthrenetetracarboxylic acid and 1,3,9,10-phenanthrenetetracarboxylic dianhydride, 3,4,9,10-perylenetetracarboxylic acid and 3,4,9,10-perylenetetracarboxylic dianhydride, bis(2,3-dicarboxyphenyl)methane and bis(2,3-dicarboxyphenyl)methane dianhydride, bis(3,4-dicarboxyphenyl)methane and bis(3,4-dicarboxyphenyl)methane dianhydride, 1,1-bis(2,3-dicarboxyphenyl)ethane and 1,1-bis(2,3-dicarboxyphenyl)ethane dianhydride, 1,1-bis(3,4-dicarboxyphenyl)ethane and 1,1-bis(3,4-dicarboxyphenyl)ethane dianhydride, 2,2-bis(2,3-dicarboxyphenyl)propane and 2,2-bis(2,3-dicarboxyphenyl)propane dianhydride, 2,3-bis(3,4-dicarboxyphenyl)propane and 2,3-bis(3,4-dicarboxyphenyl)propane dianhydride, bis(3,4-carboxyphenyl)sulfone and bis(3,4-carboxyphenyl)sulfone dianhydride, bis(3,4-carboxyphenyl)ether and bis(3,4-carboxyphenyl) ether dianhydride, ethylenetetracarboxylic acid and ethylenetetracarboxylic dianhydride, 1,2,3,4-butanetetracarboxylic acid and 1,2,3,4-butanetetracarboxylic dianhydride, 1,2,3,4-cyclopentanetetracarboxylic acid and 1,2,3,4,-cyclopentanetetracarboxylic dianhydride, 2,3,4,5- pyrrolidinetetracarboxylic acid and 2,3,4,5-pyrrolidinetetracarboxylic dianhydride, 2,3,5,6-pyrazinetetracarboxylic acid and 2,3,5,6-pyrazinetetracarboxylic dianhydride, 2,3,4,5-thiophenetetracarboxylic acid and 2,3,4,5-thiophenetetracarboxylic dianhydride.

In one embodiment, anhydrides from U.S. Pat. No. 2,155,687 or U.S. Pat. No. 3,277,117 are used for synthesizing a branched polyimide.

Polycarboxylic acid (a) or its respective anhydride can be reacted with at least one compound (b), selected from
- (b1) at least one polyamine having on average more than two amino groups per molecule, also referred to as polyamine (b1), and in some cases,
- (b2) at least one polyisocyanate having on average more than two isocyanate groups per molecule, also referred to as polyisocyanate (b2).

In some embodiments, polycarboxylic acid (a) or its respective anhydride will be reacted
either with at least one polyamine (b1)
or, in some cases, with at least one polyisocyanate (b2).

Polyamines (b1) can be aliphatic, cycloaliphatic, or, in some embodiments, aromatic. Generally, in polyamine (b1) only primary amino groups ($NH_2$-groups) will be taken into account. Tertiary and secondary amino groups—if present—will not be taken into consideration when determining the number of amino groups in polyamine (b1).

In some embodiments, polyamine (b1) has on average more than two amino groups per molecule, on average at least 2.5 amino groups per molecule, or on average at least 3.0 amino groups per molecule.

In one embodiment, polyamines (b1) are selected from mixtures from diamines and triamines.

In one embodiment, polyamine (b1) bears on average a maximum of 8. In some embodiments, polyamine (b1) bears on average a maximum of 6 amine groups per molecule.

In some embodiments, aromatic triamines and mixtures of aromatic or aliphatic diamines and aromatic triamines can be used for polyamines (b1).

Examples for aliphatic diamines to be present in said mixtures of mixtures of aromatic or aliphatic diamines and aromatic triamines as polyamines (b1) are ethylene diamine, 1,3-propylene diamine, diethylenetriamine, tetraethylenepentamine, and triethylenetetramine.

Suitable aromatic triamines that can be selected as polyamines (b1)—alone or as a mixture with at least one aromatic diamine—are chosen from triamines in which the $NH_2$ groups are attached to one (or in some cases to at least two) aromatic rings, said different aromatic rings being so-called isolated aromatic rings, conjugated aromatic rings, or fused aromatic rings.

In some embodiments, triamines with $NH_2$-groups attached to different conjugated or isolated aromatic rings are selected. Examples are 1,3,5-tri(4-aminophenoxy) benzene, 1,3,5-tri(3-methy 1,4-aminophenoxy) benzene, 1,3,5-tri(3-methoxy, 4-aminophenoxy) benzene, 1,3,5-tri(2-methyl, 4-aminophenoxy) benzene, 1,3,5-tri(2-methoxy, 4-aminophenoxy) benzene, and 1,3,5-tri(3-ethyl, 4-aminophenoxy)benzene.

Further examples for triamines are 1,3,5-tri(4-aminophenylamino) benzene, 1,3,5-tri(3-methyl, 4-aminophenylamino) benzene, 1,3,5-tri(3-methoxy, 4-aminophenylamino) benzene, 1,3,5-tri(2-methyl, 4-aminophenylamino) benzene, 1,3,5-tri(2-methoxy,4-aminophenylamino) benzene, and 1,3,5-tri(3-ethyl,4-aminophenylamino) benzene.

Examples are triamines according to formula (VII)

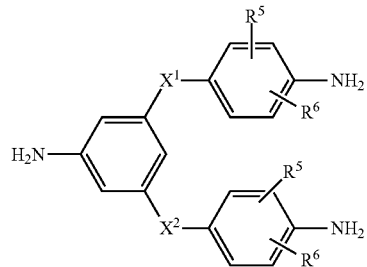

the integers being defined as follows:
$R^5$, $R^6$—being different or identical and selected from hydrogen, $C_1$-$C_4$-alkyl, $COOCH_3$, $COOC_2H_5$, CN, CF3, or O—$CH_3$;
$X^1$, $X^2$—being different or identical and selected from single bonds, $C_1$-$C_4$-alkylene groups, N—H, and oxygen, or —$CH_2$— or oxygen.

In one embodiment, polyamine (b1) is selected from 3,5-di(4-aminophenoxy)aniline, 3,5-di(3-methyl-1,4-aminophenoxy)aniline, 3,5-di(3-methoxy-4-aminophenoxy)aniline, 3,5-di(2-methyl-4-aminophenoxy)aniline, 3,5-di(2-methoxy-4-aminophenoxy)aniline, and 3,5-di(3-ethyl-4-aminophenoxy)aniline.

In one embodiment, examples are triamines according to formula (VIII)

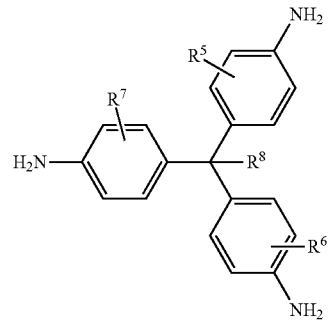

$R^7$ selected from hydrogen, $C_1$-$C_4$-alkyl, $COOCH_3$, $COOC_2H_5$, CN, $CF_3$, or O—$CH_3$;
$R^8$ selected from hydrogen or methyl
and the other integers being defined as above.

Polyisocyanate (b2) can be selected from any polyisocyanates that on average have more than two isocyanate groups per molecule, which can be capped or free. In some embodiments, trimeric or oligomeric diisocyanates can be used, for example oligomeric hexamethylene diisocyanate, oligomeric isophorone diisocyanate, oligomeric tolylene diisocyanate, including trimeric tolylene diisocyanate, oligomeric diphenylmethane diisocyanate—hereinafter also termed polymer-MDI—and mixtures of the abovementioned polyisocyanates. For example, what is termed trimeric hexamethylene diisocyanate, in many cases, is not present as pure trimeric diisocyanate, but as polyisocyanate having a medium functionality of 3.6 to 4 NCO groups per molecule. The same applies to oligomeric tetramethylene diisocyanate and oligomeric isophorone diisocyanate.

In one embodiment, polyisocyanate (b2) having more than two isocyanate groups per molecule is a mixture of at least one diisocyanate and at least one triisocyanate, or a polyisocyanate having at least 4 isocyanate groups per molecule.

In one embodiment, polyisocyanate (b2) has on average at least 2.2, at least on average 2.5, or at least on average 3.0, isocyanate groups per molecule.

In one embodiment, polyisocyanate (b2) bears on average a maximum of 8, or on average a maximum of 6 isocyanate groups per molecule.

In one embodiment, polyisocyanate (b2) is selected from oligomeric hexamethylene diisocyanate, oligomeric isophorone diisocyanate, oligomeric diphenylmethane diisocyanate, and mixtures of the abovementioned polyisocyanates.

Polyisocyanate (b2) can, in addition to urethane groups, also have one or more other functional groups, for example urea, allophanate, biuret, carbodiimide, amide, ester, ether, uretonimine, uretdione, isocyanurate or oxazolidine groups.

When polyamine (b1) and polycarboxylic acid (a) are condensed with one another—in some embodiments, in the presence of a catalyst—an imide group is formed under elimination of $H_2O$.

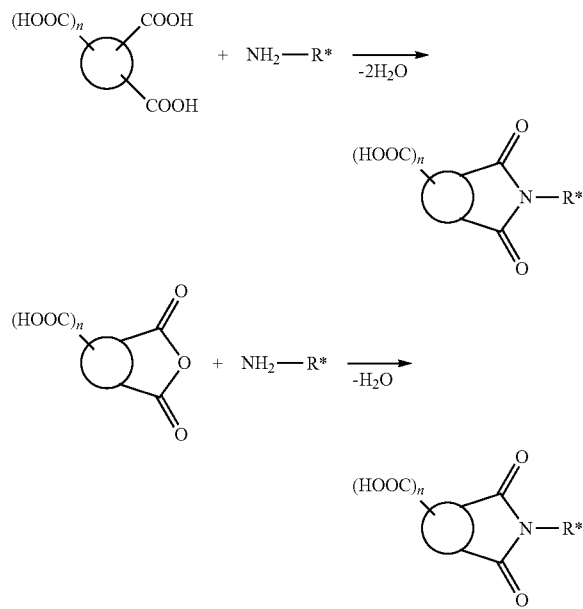

In the above formulae, R* is the polyamine (b1) radical that is not specified further in the above reaction equation, and n is a number greater than or equal to 1, for example 1 in the case of a tricarboxylic acid or 2 in the case of a tetracarboxylic acid. Optionally, $(HOOC)_n$ can be replaced with a $C(=O)$—$O$—$C(=O)$ moiety.

In some embodiments, when polyisocyanate (b2) and polycarboxylic acid (a) are condensed with one another—in some embodiments, in the presence of a catalyst—an imide group is formed with the elimination of $CO_2$ and $H_2O$. If, instead of polycarboxylic acid (a), the corresponding anhydride is used, an imide group can be formed with elimination of $CO_2$.

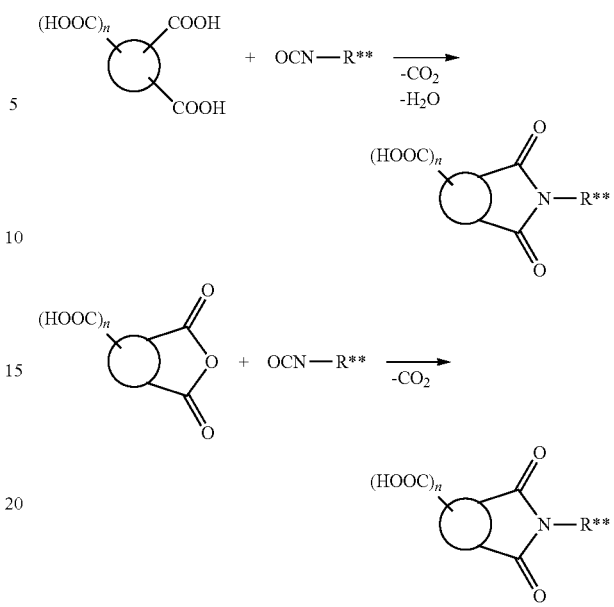

In the above formulae, R** is the polyisocyanate (b2) radical that is not specified further in the above reaction equation, and n is a number greater than or equal to 1, for example in the case of a tricarboxylic acid or in the case of a tetracarboxylic acid, and optionally, $(HOOC)_n$ can be replaced with a $C(=O)$—$O$—$C(=O)$ moiety.

In some embodiments, polyisocyanate (b2) is used in a mixture with at least one diisocyanate, for example with tolylene diisocyanate, hexamethylene diisocyanate or with isophorone diisocyanate. In a particular variant, polyisocyanate (b2) is used in a mixture with the corresponding diisocyanate, for example trimeric HDI with hexamethylene diisocyanate or trimeric isophorone diisocyanate with isophorone diisocyanate or polymeric diphenylmethane diisocyanate (polymer MDI) with diphenylmethane diisocyanate.

In some embodiments, polycarboxylic acid (a) is used in a mixture with at least one dicarboxylic acid or with at least one dicarboxylic anhydride, for example with phthalic acid or phthalic anhydride.

Exemplary synthesis methods for making branched polyimides are described below.

In some embodiments, synthesis methods for making branched polyimides comprise reacting with one another:
(a) at least one polycarboxylic acid having at least 3 COOH groups per molecule or anhydride or ester thereof, and
(b) at least one compound, selected from
    (b1) at least one polyamine having on average more than two amino groups per molecule and
    (b2) at least one polyisocyanate having on average more than two isocyanate groups per molecule
in the presence of a catalyst.

In some embodiments, water and Brønsted bases are suitable for use as catalysts, for example alkalimetal alcoholates (e.g., alkanolates of sodium or potassium, for example sodium methanolate, sodium ethanolate, sodium phenolate, potassium methanolate, potassium ethanolate, potassium phenolate, lithium methanolate, lithium ethanolate and lithium phenolate).

For carrying out the synthesis method for making branched polyimides, polyisocyanate (b2) and polycarboxylic acid (a) or anhydride (a) can be used in a quantitative ratio such that the molar fraction of NCO groups to COOH groups is in the range from 1:3 to 3:1, or from 1:2 to 2:1. In this case, one anhydride group of the formula CO—O—CO counts as two COOH groups.

In some embodiments, catalyst can be used in the range from 0.005 to 0.1% by weight, based on the sum of polyisocyanate (b2) and polycarboxylic acid (a) or polyisocyanate (b2) and anhydride (a). In some embodiments, the catalyst the percentage of the catalyst can be between 0.01 to 0.05% by weight.

In some embodiments, a synthesis method for making branched polyimides can be carried out at temperatures in the range from 50 to 200° C., from 50 to 140° C., or from 50 to 100° C.

In some embodiments, a synthesis method for making branched polyimides can be carried out at atmospheric pressure. However, the synthesis is also possible under pressure, for example at pressures in the range from 1.1 to 10 bar.

In some embodiments, a synthesis method for making branched polyimides can be carried out in the presence of a solvent or solvent mixture. Examples of suitable solvents are N-methylpyrrolidone, N-ethylpyrrolidone, dimethylformamide, dimethylacetamide, dimethyl sulfoxide, dimethyl sulphones, xylene, phenol, cresol, ketones such as, for example, acetone, methyl ethyl ketone (MEK), methyl isobutyl ketone (MIBK), acetophenone, in addition mono- and dichlorobenzene, ethylene glycol monoethyl ether acetate and mixtures of two or more of the abovementioned mixtures. In this case, the solvent or solvents can be present during the entire synthesis time or only during part of the synthesis.

The reaction can be carried out, for example, for a time period of 10 minutes to 24 hours.

In some embodiments, the synthesis method for making branched polyimides is carried out under inert gas, for example under argon or under nitrogen.

If a water-sensitive Brønsted base is used as a catalyst, a dry inert gas and solvent can be used. If water is used as catalyst, the drying of solvent and inert gas can be dispensed with.

In a variant of the synthesis method for making branched polyimides, NCO end groups of branched polyimide can be blocked with a blocking agent (c), for example with secondary amine, for example with dimethylamine, di-n-butylamine or with diethylamine.

The solvents for preparing the polymer gel based on branched polyimide may be selected from the solvents described below and may comprise electrolyte salts, including lithium salts selected from the lithium salts described below.

As another specific example, in some cases, the non-fluid material of the electrolyte itself serves as a solid electrolyte. The non-fluid material in this set of embodiments may be used in the substantial absence of an auxiliary material (e.g., a solvent) during use, in which case, the yield strength is measured in the absence of auxiliary materials. In other cases, the solid electrolyte might be used in conjunction with an auxiliary material (e.g., a solvent) during use, in which case, the yield strength of the electrolyte would be measured as the yield strength of the combination of the solid electrolyte and the auxiliary material. In either case, the electrolyte, when configured for use, can have a yield strength within any of the ranges described above and/or a thickness within any of the ranges described above.

In one embodiment of the present invention, the electrolyte (e.g., electrolyte gel) can exhibit an ionic conductivity of at least about $5\times10^{-6}$ S/cm, at least about $5\times10^{-5}$ S/cm, at least about $5\times10^{-4}$ S/cm, from about $10^{-6}$ to about $10^{-3}$ S/cm, or from about $10^{-5}$ to about $10^{-2}$ S/cm in the gel state at room temperature. One of ordinary skill in the art would be capable of determining the ionic conductivity of the electrolyte using impedance spectroscopy.

The electrolyte material can be placed between the cathode and the anode in a variety of configurations. For example, in some embodiments, the electrolyte material can be placed between the anode and an optional separator, which is discussed in more detail below. In some instances, the electrolyte material can be positioned between the anode and the cathode such that the electrolyte material has a surface in contact with a surface of the anode (e.g., anode active surface 20 in FIG. 1). For example, in some cases, the electrolyte can be formed as a layer over the anode, in which case, the electrolyte and the anode can be integrated with (e.g., covalently bonded to) each other. In one set of embodiments, the electrolyte material can serve as a separator, and no additional separator is required.

As mentioned above, the electrolyte can include an auxiliary material in some cases. The auxiliary material can be a fluid (e.g., a liquid) in some embodiments. For example, the electrolyte can include a fluid auxiliary material absorbed within a non-fluid material (e.g., as in the case of a polyethersulfone gel, a branched polyimide gel, a gel based on polyvinylalcohol or the composite of PVOH and additional (co)polymer(s) described above, or the porous PVOH comprising a non-solvent for PVOH). In some embodiments, the auxiliary material within the electrolyte can be an electrolyte solvent.

Exemplary suitable solvents for use in the electrochemical cells described herein include organic solvents. In some embodiments, the organic solvents have no active hydrogen but are sufficiently polar to dissolve a salt. Exemplary organic solvents can be selected from dioxolanes, dioxanes, organic carbonates, cyclic ethers and non-cyclic ethers.

Organic solvents can be selected from non-cyclic ethers including diethers, polyethers and cyclic ethers, acetals, and particularly organic carbonates. Among polyethers, polyethers that are liquid art room temperature can be preferred, in some cases.

Examples for suitable non-cyclic ethers, diethers, and polyethers are diisopropylether, di-n-butylether, 1,2-dimethoxyethane, 1,2-diethoxyethan, diglyme (diethylene glycol dimethyl ether), triglyme (triethylenglycol dimethyl ether).

Examples for suitable cyclic ethers are tetrahydrofurane and 1,4-dioxane.

Acetals can be cyclic or non-cyclic. Examples for suitable non-cyclic acetals are dimethoxymethane, diethoxymethane, 1,1-dimethoxyethane and 1,1-diethoxyethane. Examples for suitable cyclic acetals are 1,3-dioxane and in particular 1,3-dioxolane.

Examples for suitable organic carbonates are compounds according to the general formula (II) or (III)

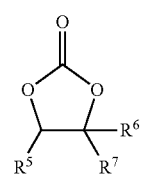

(II)

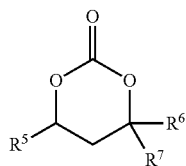

(III)

$R^5$, $R^6$ and $R^7$ being different or equal and being selected from hydrogen and $C_1$-$C_4$-alkyl, e.g. methyl, ethyl, n-propyl, iso-propyl, n-butyl, iso-butyl, sec.-butyl and tert.-butyl. In some cases, $R^6$ and $R^7$ are not both tert.-Butyl.

In one set of embodiments of the present invention, $R^5$ is selected from methyl, and $R^6$ and $R^7$ are both hydrogen, or $R^5$, $R^6$ and $R^7$ are each hydrogen.

Inventive electrochemical cells further comprise at least one salt. Salt can be selected from salts of lithium or sodium. In particular, if the cathode contains lithium, salt can be selected from lithium salts.

Suitable lithium salts are selected from lithium nitrate, $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, wherein n is an integer in the range of from 1 to 20, or $LiN(SO_2F)_2$, lithium bis-oxalatoborate (LiBOB), furthermore $Li_2SiF_6$, $LiSbF_6$, $LiAlCl_4$, and salts of the general formula $(C_nF_{2n+1}SO_2)_mXLi$ with m being 1 when X is selected from oxygen or sulfur, m being 2 when X is selected from nitrogen or phosphorus, and m being 3 when X is selected from carbon or silicium and n is an integer in the range of from 1 to 20. Suitable salts are selected from $LiC(CF_3SO_2)_3$, $LiN(CF_3SO_2)_2$, $LiN(SO_2F)_2$, $LiPF_6$, $LiBF_4$, $LiClO_4$, and $LiCF_3SO_3$.

The concentration of salt in solvent can be in the range of from about 0.5 to about 2.0 M, from about 0.7 to about 1.5 M, or from about 0.8 to about 1.2 M (wherein M signifies molarity, or moles per liter).

In one embodiment of the present invention, solution of salt in solvent(s) can comprise at least one further ingredient such as lithium nitrate, lithium bis-(trifluoromethylsulfon) imide, guanidinium nitrate, and/or g pyridinium nitrate.

In one embodiment of the present invention, inventive electrochemical cells comprise at least one filler. The filler can be selected from organic and inorganic fillers or combinations thereof. Fillers in the context of the present invention are selected from solid materials that are insoluble in the electrolyte.

Suitable inorganic fillers may be selected from metal oxides, metal nitrides, metals, and organic polymers. Examples of fillers are $Al_2O_3$, AlOOH, $TiO_2$, $SiO_2$, silica (hydrophobic or hydrophilic, including, for example fumed silica and silica fibres), clay, aluminium Boehmite, silicates (e.g., alumosilicates), and nitrides such as AN, BN, and $Li_3N$.

Suitable organic fillers may be selected from organic polymers such as cellulose (e.g., cellulose fibres or cellulose powder) or starch.

Filler can have a crystalline or an amorphous structure. Any of the polymers used herein can be crystalline, partially crystalline or amorphous.

In some embodiments, one or more fillers can be part of the non-fluid material within the electrolyte. For example, in some cases, one or more fillers can be mixed with one or more polyethersulfones and/or a blend of polyethersulfone and one or more additional (co)polymer(s), branched polyimide, PVOH or a blend of PVOH and further (co)polymers.

In one embodiment of the present invention, the electrolyte can contain from about 1% to about 95% filler, by weight, or from about 5% to about 90% filler, by weight.

In one embodiment of the present invention, filler is in the form of particles or powder whose smallest aspect dimension is up to about 50% of the thickness of the layer of polyethersulfone or of the layer of blend of polyethersulfone and additional (co)polymer. In this context, an aspect dimension is selected from diameter, length, breadth and height.

In a particular embodiment of the present invention, the filler and one or more components of the non-fluid material in the electrolyte (e.g., polyethersulfone, branched polyimide or PVOH) are covalently linked to each other, thus forming a compound. Covalent linkage between the filler and non-fluid material in the electrolyte can be achieved, e.g., by adding cross-linker to the non-fluid material and the filler and performing a cross-linking reaction, e.g. by thermal or photochemical curing.

Suitable cross-linkers are selected from molecules with two or more carbon-carbon double bonds, especially with two or more vinyl groups. Particularly useful cross-linkers are selected from di(meth)acrylates of diols such as glycol, propylene glycol, diethylene glycol, dipropylene glycol, 1,3-propanediol, 1,4-butanediol, triethylene glycol, tetrapropylene glycol, or the like. Further particularly suitable cross-linkers are selected from cyclopentadiene dimer, 1,3-divinyl benzene, and 1,4-divinyl benzene. Some suitable cross-linkers can comprise two or more epoxy groups in the molecule, such as, for example, bis-phenol F, bis-phenol A, 1,4-butanediol diglycidyl ether, glycerol propoxylate triglycidyl ether, and the like.

In one embodiment of the present invention, the organic polymer used as non-fluid material, e.g. polyethersulfone, polyimide, and/or PVOH optionally together with an additional (co)polymer is cross-linked. Cross-linking can be achieved, e.g., by adding cross-linker to the polysulfone and performing a cross-linking reaction, e.g. by thermal or photochemical curing, e.g. by irradiation with such as UV/vis irradiation, by γ-irradiation, electron beams (e-beams) or by heating (thermal cross-linking). The term "cross-linking" of polyethersulfone is not limited to classical cross-linking but also includes splitting of and recombining of chains of polyethersulfone. Suitable cross-linkers are the cross-linkers for cross-linking filler and non-fluid material in the electrolyte, e.g, polyethersulfone described above.

Referring back to FIG. 1, in one embodiment of the present invention, inventive electrochemical cells further contain an optional separator 22. The optional separator can serve to mechanically separate the cathode and the anode to prevent short-circuiting between the anode and the cathode, while allowing ions and solvent to be exchanged between the anode and the cathode. The separator can comprise synthetic or non-synthetic organic polymeric materials, and can be selected from polymer/ceramic material hybrid systems such as polymer non-woven materials coated with a ceramic material. Suitable materials for the separator are polyolefins (e.g., polyethylene or polypropylene) and fluorinated (co)polymers. The separator can comprise a microporous film, in some cases.

As mentioned above, a separator 22 independent of electrolyte 16 is an optional feature, and in one set of embodiments, the electrolyte material can serve as the separator.

Fluorinated (co)polymers in the context of the present invention refer to (co)polymers in which at least one (co) monomer bears at least one fluorine atom per molecule. Suitable fluorinated polymers include (co)polymers in which each (co)monomer bears at least one fluorine atom per molecule. In some cases, the fluorinated polymer can include (co)polymers in which each (co)monomer bears at least two fluorine atoms per molecule. Examples of suitable fluorinated (co)polymers include polytetrafluoroethylene, tetrafluoroethylene hexafluoropropylene copolymers, polyvinylidene fluoride, vinylidene fluoride hexafluoropropylene copolymers and vinylidene tetrafluoroethylene copolymers.

In some embodiments, the separator can be a porous or microporous material. The porous material can be characterized by, e.g., the pore diameter and the porosity or by the Gurley method.

In one set of embodiments of the present invention, the average pore diameter of separator can be from about 0.1 μm to about 50 μm, or from about 10 to about 30 μm.

In one set of embodiments of the present invention, the porosity of separator can be from about 30 to about 80%, or from about 40 to about 70%.

In one embodiment of the present invention, the separator has a permeability for gas in the range of from about 50 to about 1,000 Gurley seconds.

The cathode, anode, electrolyte, and/or—if present—separator can have any suitable shape and/or size. In some embodiments, the cathode, anode, electrolyte, and/or optional separator are layers or films each with a thickness in the range of from about 10 μm to about 1000 μm, or from about 100 μm to about 500 μm.

In one set of embodiments of the present invention, the cathode has a thickness in the range of from about 1 μm to about 500 μm, or from about 100 μm to about 200 μm.

In one set of embodiments of the present invention, the anode has a thickness of from about 5 to about 50 μm, or from about 10 to about 20 μm.

In one set of embodiments of the present invention, separator can have a thickness of from about 5 μm to about 50 μm, or from about 7 to about 25 μm.

In some embodiments, polyethersulfone (C) is placed between electrode (A) and electrode (B), between electrode (B) and separator (I) or on the surface of electrode (B).

In some embodiments, electrode (B) is a multi-layer electrode comprising film(s) of lithium or lithium alloy, polyether sulfone (C), optionally additional (co)polymer (F), and optionally organic or inorganic filler (G).

Inventive electrochemical cells can be advantageously used for making batteries, especially secondary batteries. Said batteries can have good properties such as high capacity per volume or kg, they can be recharged with little capacity loss in many cycles, and/or they do not exhibit the thermal runaway at elevated temperatures such as 150° C. to 230° C.

In some embodiments, the electrochemical cells described herein can be cycled at relatively high temperatures without experiencing thermal runaway. The term "thermal runaway" is understood by those of ordinary skill in the art, and refers to a situation in which the electrochemical cell cannot dissipate the heat generated during charge and discharge sufficiently fast to prevent uncontrolled temperature increases within the cell. Often, a positive feedback loop can be created during thermal runaway (e.g., the electrochemical reaction produces heat, which increases the rate of the electrochemical reaction, which leads to further production of heat), which can cause electrochemical cells to catch fire. In some embodiments, the electrolyte (e.g., the polymer material within the electrolyte) can be configured such that thermal runaway is not observed at relatively high temperatures of operation of the electrochemical cell. Not wishing to be bound by any particular theory, the polymer within the electrolyte (e.g., polyethersulfone) may slow down the reaction between the lithium (e.g., metallic lithium) and the cathode active material (e.g., sulphur such as elemental sulfur) in the electrochemical cell, inhibiting (e.g., preventing) thermal runaway from taking place. Also, the polymer within the electrolyte may serve as a physical barrier between the lithium and the cathode active material, inhibiting (e.g., preventing) thermal runaway from taking place.

In some embodiments, the electrolyte (e.g., the polymer within the electrolyte) can be configured such that the electrochemical cell can be operated (e.g., continuously charged and discharged) at a temperature of up to about 130° C., up to about 150° C., up to about 170° C., up to about 190° C., up to 210° C., or up to 230° C. (e.g., as measured at the external surface of the electrochemical cell) without the electrochemical cell experiencing thermal runaway. In some embodiments, the electrochemical cell can be operated at any of the temperatures outlined above without igniting. In some embodiments, the electrochemical cells described herein can be operated at relatively high temperatures (e.g., any of the temperatures outlined above) without experiencing thermal runaway and without employing an auxiliary cooling mechanism (e.g., a heat exchanger external to the electrochemical cell, active fluid cooling external to the electrochemical cell, and the like).

Inventive electrochemical cells can provide a high percentage of sulphur utilization, such as 60% or more, at a discharge rate of 10 hours or less.

A further aspect of the present invention is a method to manufacture electrochemical cells. Said methods are hereinafter also referred to as inventive methods. One set of inventive methods comprises the following steps:

(1) providing lithium or a lithium alloy which may be deposited on a substrate, (2) depositing a solution of at least one organic polyethersulfone with at least one heteroatom containing (co)monomer in an organic solvent on said lithium or lithium alloy, (3) adjusting the solvent content of polyethersulfone to a range of from 0.01 to 25% by weight, (4) treating said deposited polyethersulfone with at least one salt of lithium or sodium in at least one organic solvent.

Said steps are described in more detail below.

In step (1), lithium or a lithium alloy is provided. Lithium alloys have been described above.

The lithium or lithium alloy can be provided in any form, e.g., a powder. In some cases, the lithium or lithium alloy is provided in a form deposited on a substrate such as, e.g., a polymer.

In one embodiment, said substrates are selected from current collectors and from polymer carriers.

Said substrate can be a polymer film, in some instances. Polymer films can be made of various polymers such as polyesters such as polyethylene terephthalate, polysilicones (silicones), and siliconized polyesters.

In cases in which the lithium or lithium alloy is deposited on a substrate, said lithium or lithium alloy can be deposited as a layer or foil. In some embodiments, each layer or foil can have a thickness from about 2 μm to about 200 μm, from about 5 μm to about 50 μm, from about 2 μm to about 35 μm, from about 5 μm to about 35 μm, or up to about 35 μm.

Deposition of lithium or lithium alloy can be performed by, e.g., sputtering, thermal evaporation and condensation, jet vapour deposition, and LASER ablation.

In one embodiment of the present invention, in step (1), a substrate with lithium or lithium alloy and optionally ceramic material deposited thereon is provided. For instance, the ceramic material can be deposited in connection with the lithium. Ceramic materials have been described above. Ceramic material and lithium or lithium alloy can be deposited together, in some instances in alternating layers. For example, in some embodiments, ceramic material can be deposited on the lithium or lithium alloy and/or ceramic material can be deposited between portions of the lithium or lithium alloy (e.g., between layers of lithium or lithium alloy). In one embodiment of the present invention, up to ten layers of lithium or lithium alloy and up to ten layers of ceramic material can be deposited alternatingly on said substrate, each layer having a thickness in the range of from 0.1 to 25 µm.

In step (2), a solution of at least one polyethersulfone in a solvent can be deposited on lithium or a lithium alloy which has been deposited on the substrate. The depositing can be performed, e.g., by spraying, roller coating, dipping, casting, spin coating, printing by letter press, doctor blade, ink-jet printing, screen printing, or web coating.

Polyethersulfone has been described above in detail, and polyethersulfone can be deposited in pure form or as a blend with at least one additional (co)polymer. The solution of polyethersulfone, or of polyethersulfone and additional (co) polymer, respectively, can have a solids content of from about 1% to about 50% by weight, or from about 5% to about 20% by weight. The solution of organic polyether sulfone (C) may additionally comprise an organic or inorganic filler (G) and/or a (co)polymer (F).

The solvent used to deposit the polyethersulfone (or another non-fluid material in the electrolyte) can be selected from non-protic halogen-free organic solvents. In some embodiments, the solvent can be selected from cyclic or non-cyclic ethers, cyclic or non-cyclic carbonates, cyclic or non-cyclic acetals, cyclic or non-cyclic ketals, or cyclic or non-cyclic amides, and mixtures of two or more of the previous. Other examples of suitable solvents that can be used to deposit polyethersulfone or any other non-fluid material in the electrolyte include the solvents described above for use within the final electrochemical cell (e.g., the auxiliary material solvents described above and organic solvent (D), respectively). In some embodiments, the solvent used to deposit polyethersulfone or another non-fluid material in the electrolyte (solvent (D1)) can be the same solvent that is present within the assembled electrochemical cell (organic solvent (D)). In other cases, the solvent used to deposit polyethersulfone or another non-fluid material in the electrolyte (D1) can be different than the solvent present within the assembled electrochemical cell (D).

In one embodiment of the present invention, the solvent used to deposit polyethersulfone or another non-fluid material in the electrolyte is selected from cyclic or non-cyclic organic amides, and the solvent present within the assembled electrochemical cell is selected from cyclic or non-cyclic ethers, cyclic or non-cyclic carbonates, and cyclic or non-cyclic acetals.

In step (3) of inventive method, the residual solvent content of polyether sulfone can be adjusted to be from about 0.01% to about 25% by weight, measured as a percentage of the sum of the masses of the residual solvent and the polyether sulfone. Said adjustment can be achieved by evaporation, e.g. by heat treatment, in some cases under reduced pressure. Reduced pressure in the context of the present invention can be in a range of from about 1 to about 500 mbar.

The residual solvent content can be measured by thermogravimetric analysis.

In step (4) of the inventive method, deposited polyethersulfone, in pure form or as blend at least one additional (co)polymer, will be treated with a solution of at least one salt of lithium (E) in at least one organic solvent (D). Solvent (D) can be selected from the solvents described above as suited as organic solvent (D).

Salts have been characterized above. The concentration of salt in solvent can be from about 0.1 M to about 2.0 M, or from about 1.0 M to about 1.2 M. Said treatment can be performed by, e.g., dipping, or spraying.

Steps (2), (3) and (4) of the inventive method can be performed at various temperatures. Steps (2) and (4) can be performed at ambient temperature, in some embodiments.

In one embodiment of the present invention, step (3) of the inventive method can be performed at ambient temperature or at a temperature of from about 30° C. to about 150° C., or from about 40° C. to about 70° C.

In one embodiment of the present invention, an additional step (5) is added after steps (1) to (4). Additional step (5) comprises removal of the substrate from the lithium or the respective lithium alloy. Said step (5) can be carried out mechanically, in some instances.

In case the substrate whereon lithium or the respective lithium alloy has been deposited is a siliconized polyester foil, step (5) is performed particularly easy.

In one embodiment of the present invention, the inventive process additionally comprises the step of (6) crosslinking the deposited polyethersulfone.

In one embodiment of the present invention, an additional step (6) is added after steps (1) to (4) and, optionally, step (5). Additional step (6) comprises cross-linking organic polyethersulfone alone or with filler. Said cross-linking can be performed by thermal cross-linking or UV/vis irradiation, by γ-irradiation, or by electron beams. Said cross-linking can be performed in the presence of one or more cross-linkers. In some cases in which cross-linking is performed by UV/vis irradiation, one can add a photoinitiator (e.g., at about 0.5-5% of the polymer) to improve the cross-linking reaction.

Instead of polysulfones other (co)polymers like PVOH and branched polyimide may be used in the method to manufacture electrochemical cells described above.

An anode/electrolyte combination manufactured according to the inventive process described above can be combined with a cathode, and optionally with a separator to form an electrochemical cell (e.g., a battery such as a lithium sulfur battery). Optionally, further constituents such as electrode terminal connections and a housing such as a box or a bag or pouch can be added to form an electrochemical cell.

Two or more inventive electrochemical cells can be combined to form a battery. An inventive battery contains at least two inventive electrochemical cells together with the necessary cable connections and with a housing.

A further aspect of the present invention is a process for running a machine containing one or more inventive electrochemical cells or an inventive battery.

Suitable machines include transportation devices, such as aircraft, automobiles, locomotives, and ships. Due to the advantageous rechargeability (cycleability) of inventive electrochemical cells, high efficiency can be achieved. Furthermore, running said machines can also particularly safe due to reduced thermal runaway problems.

U.S. Provisional Patent Application Ser. No. 61/376,559, filed Aug. 24, 2010, and entitled "Electrolyte Materials for Use in Electrochemical Cells," is incorporated herein by reference in its entirety for all purposes. In addition, a U.S. Utility Patent Application, filed on Aug. 24, 2011, under attorney docket number S1583.70032US01, and entitled "Electrolyte Materials for Use in Electrochemical Cells" is also incorporated by reference herein in its entirety for all purposes.

EXAMPLES

The following examples are intended to illustrate certain embodiments of the present invention, but do not exemplify the full scope of the invention.

All percentages are referring to percent by weight unless expressly stated otherwise.

The following materials were used:

Polyethersulfone (C.1) $M_w$ 33,000 g/mol, $M_w/M_n$=4.5, methylated polycondensation product of

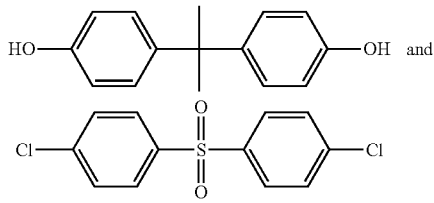

Polyethersulfone (C.2) $M_w$ 38,500 g/mol, $M_w/M_n$=3.5, methylated polycondensation product of

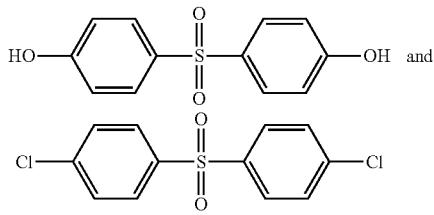

Fillers:
(G.1) fumed silica commercially available as TS-720 from Cabot
(G.2) fumed silica commercially available as Aerosil® R812 from Evonik-Degussa
(G.3) clay commercially available as Cloisite 30B
Separator (I.1): Tonen. Micorporous polyethylene; thickness: 9 μm; 270 Gurley seconds.
Separator (I.2): Celgard. Triple layer (Polypropylene/Polyethylene/Polypropylene) micorporous separator; thickness 25 μm; 620 Gurley seconds.
Cathode (A.1): 55% sulfur, 20% XE-2 carbon, 20% Vulcan carbon, and 5% polyvinylalcohol binder with sulfur active material loading of 1.85 mg/cm². Total cathode active area in the cell was about 90 cm².
All cycling experiments were performed under a pressure of 10 kg/cm².
Electrolyte 1:
Solution of 4 g lithium nitrate, 8 g lithium bis-(trifluoromethylsulfon)imide, 1 g guanidinium nitrate, and 0.4 g pyridinium nitrate in 43.8 g 1,2-dimethoxy ethane and 43.8 g 1,3-dioxolane.
Branched Polyimide (HPI.1) with Mw 1,700 g/mol prepared by the reaction of the dianhydride of 1,2,4,5-benzene tretracarboxylic acid with polymeric 4,4'-diphenylmethane diisocyanate having an average of 2.7 isocyanate groups per molecule, dynamic viscosity: 195 mPa·s at 25° C., commercially availabe as Lupranat® M20W.

Example 1

This example outlines, according to one set of embodiments, the manufacture of an inventive electrochemical cell EC.1

A slurry was prepared from a solution of polyethersulfone (C.1) (10% wt.) and filler (G.1) (10% wt.) in diethyleneglycol dimethyl ether was coated onto vacuum deposited lithium (VDL) on a web coater. The weight ratio of polysulfone/silica was 7:3. The gel layer was dried in a gel coater oven at 65-80° C. An anode (B.1) with a dry gel layer was obtained. The resulting thickness of the dry gel layer was 7 μm. A triple bi-cell with above anodes (B.1), separators (I.1) and cathodes (A.1) was assembled and filled with electrolyte 1. Inventive electrochemical cell EC.1 was obtained. Inventive electrochemical cell EC.1 displayed 1015 mAh/g sulfur specific capacity on the $5^{th}$ discharge. Inventive electrochemical cell EC.1 was cycled for 10 cycles and went for a safety test. The inventive electrochemical cell EC.1 at fully charged conditions was ramped at 5° C./min without going into thermal runaway up to 230° C.

Comparative Example 1

A triple bi-cell with VDL anode, separator (I.1) and cathodes (A.1) was assembled and filled with electrolyte 1. Comparative electrochemical cell C-EC.2 was obtained. Comparative electrochemical cell C-EC.2 displayed 982 mAh/g specific capacity on the $5^{th}$ discharge. Comparative electrochemical cell C-EC.2 was cycled for 10 cycles and went for the safety test. Comparative electrochemical cell C-EC.2 was ramped at 5° C./min and went into thermal runaway at 140° C.

Example 2

This example describes, according to some embodiments, the manufacture of an inventive electrochemical cell EC.3.

A slurry prepared from a solution of polyethersulfone (C.1) (10% wt.) and filler (G.2) (10% wt.) in diethyleneglycol dimethyl ether was coated onto VDL on a web coater. The weight ratio of polysulfone/silica was 7:3. The gel layer was dried in a gel coater oven at 65-80° C. An anode (B.3) with a dry gel layer was obtained. The resulting thickness of the dry gel layer was 7 μm. A triple bi-cell with above anodes (B.3), separators (I.1) and cathodes (A.1) was assembled and filled with electrolyte 1. Inventive electrochemical cell EC.3 was obtained. Inventive electrochemical cell EC.3 displayed 1025 mAh/g specific capacity on the $5^{th}$ discharge. Inventive electrochemical cell EC.3 was cycled for 10 cycles and went for the safety test. Inventive electrochemical cell EC.3 was ramped to 230° C. without going into thermal runaway.

Example 3

This example describes the manufacture of an inventive electrochemical cell EC.4, according to one set of embodiments.

A slurry prepared from a solution of polyethersulfone (C.1) (10% wt.) and filler (G.3) (10% wt.) in diethyleneglycol dimethyl ether was coated onto VDL on a web coater. The weight ratio of polysulfone/silica was 1:1. An anode (B.4) with a dry gel layer was obtained. The gel layer was dried in a gel coater oven at 65 80° C. An anode (B.4) with a dry gel layer was obtained. The resulting thickness of the dry gel layer was 7 μm. A triple bi-cell (EC.4) with above anodes (B.3), separators (I.2) and cathodes (A.1) was assembled and filled with electrolyte 1. Inventive electrochemical cell EC.4 was obtained. Inventive electrochemical cell EC.4 displayed 1019 mAh/g specific capacity on the $5^{th}$ discharge.

Example 4

This example describes, according to one set of embodiments, the manufacture of an inventive electrochemical cell EC.5.

A slurry prepared from a solution of polyethersulfone (C.1), filler (G.1) and dipropylenglycol diacrylate with photoinitiator in diethyleneglycol dimethyl ether was coated onto vacuum deposited lithium (VDL) on a web coater and irradiated with UV light in argon atmosphere. The following properties were observed: Weight ratio (C.1)/(F.1)/diacrylate=49.3/21.1/29.6; total solids content: 10% by weight. An anode (B.5) with a dry gel layer was obtained. The resulting thickness of dry gel layer was 5 μm. A triple bi-cell with above anodes (B.5), separators (I.2) and cathodes (A.1) was assembled and filled with electrolyte 1. Inventive electrochemical cell EC.5 was obtained. Inventive electrochemical cell EC.5 displayed 1068 mAh/g specific capacity on the $5^{th}$ discharge.

Example 5

This example describes the manufacture of an inventive electrochemical cell EC.6, according to some embodiments.

A slurry prepared from a solution of polyethersulfone (C.1) and filler (G.1) in 1,4-dioxane was coated onto vacuum deposited lithium (VDL) on a web coater and irradiated with UV light in argon atmosphere. The weight ratio of polysulfone/silica was 7:3. The total solids content was about 10% by weight. Drying was achieved via UV light exposure at a temperature of 40-65° C. An anode (B.6) with a dry gel layer was obtained. The resulting thickness of dry gel layer was 6 μm. A triple bi-cell with above anodes (B.6), separators (I.2) and cathodes (A.1) was assembled and filled with electrolyte 1. Inventive electrochemical cell EC.6 was obtained. Inventive electrochemical cell EC.6 displayed 1025 mAh/g specific capacity on the $5^{th}$ discharge.

Example 6

This example describes the manufacture of polymer electrolyte gel comprising HPI.1.

A solution comprising 30 wt.-% of HPI.1 in DMAc was prepared and coated by a doctor blade onto a lithium electrode comprising vacuum deposited lithium (VDL) on the top surface (example 6.a) and on Ni-electrodes (example 6.b, for measuring the conductivity, see example 8) at 80° C. for 2 h and was then dried for 24 h in a vacuum oven at the same temperature. Subsequently the films were immersed in electrolyte 1 for 24 to 48 h.

Example 7

This example describes the measurement of the hardness of a lithium electrode comprising vacuum deposited lithium (VDL) on the top surface and the lithium electrode comprising vacuum deposited lithium (VDL) on the top surface coated with HPI.1 and swollen with electrolyte 1 from example 6.a. The hardness was measured with an AFM device (Veeco, N.Y., USA) by indentation with a Berkovich-type indenter ("Triposcope" HYSITRON, Minn., USA) with a load of 1000 μN and a depth of indentation of about 2000 nm. The hardness was calculated from the E-module. The hardness of the uncoated lithium was 9 MPa, the hardness of the lithium coated by the polymer gel electrolyte of example 6.a was 80 MPa.

Example 8

This example describes the measurement of the conductivity of the polymer gel electrolyte from example 6.b. The conductivity was determined by measuring the impedance with an impedance measurement unit (model IM6ex by Zahner (Germany)) at a voltage of 5 mV (AC) and a frequency of from 1 MHz to 10 HZ. The conductivity was $7.4 \times 10^{-4}$ S/cm.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
   an electrochemical cell, comprising:
   a first electrode comprising lithium metal;
   a second electrode;
   an electrolyte comprising a solvent, a lithium bis-oxalatoborate salt, a lithium nitrate salt, and a further lithium salt, wherein a total salt content in the solvent is between 0.5 M and 2 M; and
   a ceramic material deposited on the lithium metal.

2. The article of claim 1, wherein the electrochemical cell further comprises a guanidinium nitrate salt.

3. The article of claim 1, wherein the electrochemical cell further comprises a pyridinium nitrate salt.

4. The article of claim 1, wherein the electrolyte comprises a first component and a second component.

5. The article of claim 1, wherein the electrolyte is a polymer gel electrolyte.

6. The article of claim 1, wherein the electrolyte has a yield strength greater than a yield strength of lithium metal.

7. The article of claim 1, wherein a concentration of the oxalatoborate-containing salt in the electrolyte is from about 0.5 M to about 2.0 M.

8. The article of claim 1, wherein the electrolyte has a salt concentration of about 0.8 M to about 1.2 M.

9. The article of claim 1, wherein the electrolyte has a salt concentration of about 0.7 M to about 1.5 M.

10. The article of claim 1, wherein the second electrode comprises sulfur.

11. The article of claim 1, wherein the electrolyte is a liquid.

12. The article of claim 1, wherein the electrolyte comprises a polyethersulfone.

13. The article of claim 1, wherein the electrochemical cell further comprises a separator positioned between the first electrode and the second electrode.

14. The article of claim 1, wherein the ionic conductivity of the electrolyte is at least $5 \times 10^{-6}$ S/cm at room temperature.

15. The article of claim 1, wherein the electrolyte comprises a carbonate.

16. An article, comprising:
    an electrochemical cell, comprising:
    a first electrode comprising lithium metal;
    a second electrode;
    an electrolyte comprising a solvent, a lithium bis-oxalatoborate salt, a lithium nitrate salt, and $LiPF_6$, wherein a total salt content in the solvent is between 0.5 M and 2 M; and
    a ceramic material deposited on the lithium metal.

* * * * *